(12) United States Patent
Mizuochi et al.

(10) Patent No.: US 9,075,139 B2
(45) Date of Patent: Jul. 7, 2015

(54) SATELLITE SIGNAL TRACKING METHOD AND RECEIVER

(75) Inventors: Shunichi Mizuochi, Matsumoto (JP); Kazumi Matsumoto, Shiojiri (JP); Anand Kumar, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 434 days.

(21) Appl. No.: 13/210,177

(22) Filed: Aug. 15, 2011

(65) Prior Publication Data
US 2012/0038508 A1  Feb. 16, 2012

(30) Foreign Application Priority Data

Aug. 16, 2010  (JP) ................................ 2010-181701

(51) Int. Cl.
*G01S 19/26* (2010.01)
*G01S 19/29* (2010.01)
*G01S 19/25* (2010.01)

(52) U.S. Cl.
CPC ............... *G01S 19/254* (2013.01); *G01S 19/26* (2013.01); *G01S 19/29* (2013.01)

(58) Field of Classification Search
CPC ........ G01S 19/26; G01S 19/254; G01S 19/29
USPC ........................................ 342/357.65, 357.68
See application file for complete search history.

(56) References Cited

U.S. PATENT DOCUMENTS

| 5,703,597 | A | * | 12/1997 | Yu et al. | 342/357.65 |
|---|---|---|---|---|---|
| 6,397,146 | B1 | * | 5/2002 | Bruner | 701/472 |
| 6,775,319 | B2 | * | 8/2004 | King et al. | 375/150 |
| 6,850,557 | B1 | * | 2/2005 | Gronemeyer | 375/150 |
| 6,891,499 | B2 | * | 5/2005 | Dooley et al. | 342/357.62 |
| 7,046,194 | B2 | * | 5/2006 | Dooley et al. | 342/357.62 |
| 7,391,366 | B2 | * | 6/2008 | Park et al. | 342/357.59 |
| 8,502,732 | B2 | * | 8/2013 | Pon | 342/357.68 |
| 2002/0198656 | A1 | * | 12/2002 | Ford et al. | 701/213 |
| 2006/0111840 | A1 | * | 5/2006 | van Diggelen | 701/215 |
| 2007/0273582 | A1 | * | 11/2007 | Klinghult et al. | 342/357.06 |
| 2008/0018531 | A1 | * | 1/2008 | Matsumoto | 342/357.05 |
| 2011/0068979 | A1 | * | 3/2011 | Waters et al. | 342/357.65 |

FOREIGN PATENT DOCUMENTS

| EP | 1677124 A1 | * | 7/2006 | ............. G01S 19/26 |
|---|---|---|---|---|
| JP | 02-157678 A | | 6/1990 | |
| JP | 04359177 A | * | 12/1992 | ............. G01S 5/14 |
| JP | 2009-103488 A | | 5/2009 | |

* cited by examiner

*Primary Examiner* — Gregory C Issing
(74) *Attorney, Agent, or Firm* — Kilpatrick Townsend & Stockton LLP

(57) ABSTRACT

A satellite signal tracking method performed by a receiver that receives a satellite signal from a positioning satellite, the satellite signal tracking method including: computing a first Doppler frequency using a received signal obtained by receiving the satellite signal, computing a second Doppler frequency using the first Doppler frequency and a signal from the sensor unit including at least an acceleration sensor, and acquiring the satellite signal using the second Doppler frequency.

7 Claims, 21 Drawing Sheets

171

DOPPLER SUMMATION DATA

| TIME (1711) | ABSOLUTE COORDINATE ACCELERATION VECTOR (1713) |
|---|---|
| u1 | (ax1,ay1,az1) |
| u2 | (ax2,ay2,az2) |
| u3 | (ax2,ay2,az2) |
| ⋮ | ⋮ |

INS UNIT

PROCESSING UNIT — 210

STORAGE UNIT — 220

SECOND INS PROCESSING PROGRAM — 222

ABSOLUTE COORDINATE ACCELERATION VECTOR — 227

FIG. 13

[MULTIPATH ENVIRONMENT]

SATELLITE SIGNAL TRACKING METHOD AND RECEIVER

BACKGROUND

1. Technical Field

The present invention relates to a satellite signal tracking method and a receiver.

2. Related Art

As a positioning system using a satellite signal, there is known a global positioning system (GPS), which is used in a position computing apparatus integrated in a mobile phone, a car navigation apparatus, or the like. In the GPS, a position computation is performed in which position coordinates of the position computing apparatus and a time-watch error are obtained based on information such as positions of a plurality of GPS satellites or pseudo distances from each GPS satellite to the position computing apparatus.

In a case where the positioning system using the satellite signal is solely used, the position computation accuracy is degraded due to various error sources. For this reason, various techniques have been proposed to improve the position computation accuracy. For example, in regard to a flying object having an accelerometer, JP-A-2009-103488 discloses a technique of acquisition/tracking of the GPS satellite signals by reflecting a signal from the accelerometer on an acquisition/tracking circuit of the GPS satellite signal.

The technique disclosed in JP-A-2009-103488 may be directly applied to a mobile object having the acceleration sensor as follows. That is, accelerations detected by the acceleration sensor are integrated to compute a velocity. In addition, a Doppler frequency is computed using a relative velocity of the mobile object with respect to the velocity of the positioning satellite and a viewing direction directed to the positioning satellite from the mobile object. The computed Doppler frequency is reflected on a loop circuit (typically, a phase-locked loop (PLL)) for tracking the satellite signal.

If the Doppler frequency can be appropriately obtained, the acquisition/tracking of the satellite signal can also be appropriately carried out. However, whether or not the Doppler frequency can be appropriately obtained depends on the detection accuracy of the acceleration sensor and the accuracy of the position computation using the positioning signal. If the detection accuracy of the acceleration sensor is low, a velocity necessary to compute the Doppler frequency may not be correctly obtained. If the accuracy of the position computation is low, a viewing direction necessary to compute the Doppler frequency may not be correctly obtained.

In recent years, micro-electro mechanical systems (MEMS) sensors obtained by applying semiconductor micromachining techniques have been mounted in various consumer appliances as small-sized and inexpensive acceleration sensors. While an MEMS sensor has some advantages such as a small size, a light weight, inexpensive cost, and low power consumption, it has disadvantages in that it is vulnerable to influence from the external environment such as impact, vibration, or temperature change. For this reason, a significant error may be included in the detection result of the acceleration sensor due to the influence from the external environment such as temperature change or vibration. In addition, the accuracy of the position computation may also be significantly degraded due to various reasons including the environment for receiving the satellite signal, such as a multipath environment or a weak electric field environment, a received signal strength, and arrangement of the positioning satellites.

SUMMARY

An advantage of some aspects of the invention is to provide a novel technique of appropriately acquiring the satellite signal.

A first aspect of the invention is directed to a satellite signal tracking method performed by a receiver that receives a satellite signal from a positioning satellite, the satellite signal tracking method including: computing a first Doppler frequency using a received signal obtained by receiving the satellite signal; computing a second Doppler frequency using a signal from a sensor unit including at least an acceleration sensor and the first Doppler frequency; and acquiring the satellite signal using the second Doppler frequency.

Another aspect of the invention is directed to a receiver that receives a satellite signal from a positioning satellite, the receiver including: a first Doppler computation unit that computes a first Doppler frequency using a received signal obtained by receiving the satellite signal; a second Doppler computation unit that computes a second Doppler frequency using a signal from a sensor unit including at least an acceleration sensor and the first Doppler frequency; and an tracking unit that tracks the satellite signal using the second Doppler frequency.

According to the first and the like aspects of the invention, the first Doppler frequency is computed using a received signal obtained by receiving the satellite signal from the position satellite, and the second Doppler frequency is computed using the signal from the sensor unit including at least an acceleration sensor and the first Doppler frequency. In addition, the satellite signal is acquired using the second Doppler frequency.

Unlike a simple technique in which the satellite signal is acquired using the first Doppler frequency computed using the received signal of the satellite signal, the satellite signal is acquired using the second Doppler frequency computed using the first Doppler frequency and the signal from the sensor unit including at least the acceleration sensor. As a result, it is possible to appropriately acquire the satellite signal using the second Doppler frequency having higher accuracy than that of the first Doppler frequency.

A second aspect of the invention is directed to the satellite signal tracking method of the first aspect, which further includes: computing a position using the signal from the sensor unit; computing a provisional position using the first Doppler frequency; and correcting the position using the provisional position, wherein the computation of the second Doppler frequency includes computing the second Doppler frequency using a viewing direction to the positioning satellite from the corrected position and the measurement result.

According to the second aspect, it is possible to obtain the position with higher accuracy by correcting the position computed using the signal from the sensor unit using the provisional position computed using the first Doppler frequency. In addition, since the viewing direction to the positioning satellite is appropriately obtained using the accurate position, it is possible to improve accuracy of the computed second Doppler frequency.

A third aspect of the invention is directed to the satellite signal tracking method of the first aspect, wherein the computation of the second Doppler frequency includes computing a third Doppler frequency using the signal from the sensor unit and the viewing direction to the positioning satellite and computing the second Doppler frequency by synthesizing the first Doppler frequency and the third Doppler frequency.

According to the third aspect, the third Doppler frequency is computed using the signal from the sensor unit and the viewing direction to the positioning satellite. In addition, the first and third Doppler frequencies are synthesized. It is possible to obtain the Doppler frequency with higher accuracy by synthesizing the Doppler frequencies computed using different techniques in this manner.

A fourth aspect of the invention is directed to the satellite signal tracking method of the third aspect, wherein the computation of the third Doppler frequency includes computing a Doppler frequency change amount using the viewing direction and the acceleration measured by the sensor unit and computing the third Doppler frequency by summing the Doppler frequency change amount.

According to the fourth aspect, the Doppler frequency change amount is computed using the viewing direction to the positioning satellite and the acceleration measured by the sensor unit. In addition, the third Doppler frequency is computed by summing the Doppler frequency change amount. For example, it is possible to appropriately obtain the third Doppler frequency by computing the Doppler frequency change amount for a predetermined time period using the acceleration measured at a predetermined measurement time interval and summing the Doppler frequency change amount.

A fifth aspect of the invention is directed to the satellite signal tracking method of the third or fourth aspect, wherein a weight factor of the third Doppler frequency is larger than that of the first Doppler frequency in the synthesizing.

According to the fifth aspect, since the weight factor of the third Doppler frequency is larger than that of the first Doppler frequency in the synthesizing, it is possible to compute the second Doppler frequency by giving a higher weight to the third Doppler frequency.

A sixth aspect of the invention is directed to the satellite signal tracking method according to any one of the first to fifth aspects, which further includes: filtering out via a first loop filter that filters the received signal of the satellite signal at a first loop bandwidth; filtering via a second loop filter that filters the received signal of the satellite signal at a second loop bandwidth narrower than the first loop bandwidth; and computing a fourth Doppler frequency using a result of filtering via the second loop filter and the second Doppler frequency, wherein the computation of the first Doppler frequency includes computing the first Doppler frequency by filtering via the first loop filter, and the acquiring includes using the fourth Doppler frequency.

According to the sixth aspect, the first Doppler frequency is computed by filtering via the first loop filter in which the received signal of the satellite signal is filtered within a first loop bandwidth. Meanwhile, filtering via the second loop filter is performed using a second loop bandwidth narrower than the first loop bandwidth. In addition, the fourth Doppler frequency is computed using the result of filtering via the second loop filter and the second Doppler frequency, and the satellite signal is acquired using the fourth Doppler frequency.

Since filtering via the second loop filter is performed using a loop bandwidth narrower than that of the first loop filter, it is possible to improve Doppler frequency computation accuracy. In addition, since the result of filtering via the second loop filter and the second Doppler frequency are used, it is possible to obtain the fourth Doppler frequency with higher accuracy than that of the first Doppler frequency. Since the fourth Doppler frequency is used, it is possible to more reliably carry out the satellite signal tracking.

A seventh aspect of the invention is directed to the satellite signal tracking method according to any one of the first to sixth aspects, wherein the acquiring includes acquiring the satellite signal using the first Doppler frequency when the satellite signal satisfies a predetermined high-strength condition, and acquiring the satellite signal using the second Doppler frequency when the satellite signal does not satisfy the high-strength condition.

According to the seventh aspect, the satellite signal is acquired using the first Doppler frequency when the satellite signal satisfies the high-strength condition. In contrast, the satellite signal is acquired using the second Doppler frequency when the satellite signal does not satisfy the high-strength condition. As a result, it is possible to reduce a processing load relating to the satellite signal tracking.

BRIEF DESCRIPTION OF THE DRAWINGS

The invention will be described with reference to the accompanying drawings, wherein like numbers reference like elements.

FIG. 12 is a diagram illustrating an exemplary data structure of Doppler summation data.

FIG. 13 illustrates an exemplary data structure of a storage unit of an INS unit according to a second embodiment.

DESCRIPTION OF EXEMPLARY EMBODIMENTS

Hereinafter, exemplary embodiments of the invention will be described in detail with reference to the accompanying drawings, and those embodiments are not intended to limit the invention.

1. Principle

First, a principle of the position computation according to an embodiment of the invention will be described. In the present embodiment, a global positioning system (GPS) as one type of satellite positioning system and an inertial navigation system (INS) as one type of inertial navigation system are combined to carry out the position computation of a mobile object.

Although the present embodiment mainly focuses on the position computation, acceleration or velocity is also additionally computed in order to implement the position computation. Since the acceleration and the velocity have a direction and a magnitude, the acceleration and the velocity are expressed as an acceleration vector and a velocity vector, respectively, herein. The term "vector" is used to express a direction as well as a magnitude for simplicity. It is apparent that, although the direction and the magnitude may be represented using values on each axis, for example, in either a rectangular coordinate system or a spherical coordinate system, the vector can be equivalently expressed by either notation methods. Therefore, in the present specification, the term "vector" is used to represent both the direction and the magnitude.

1-1. First Position Computation Method

Figure 1:
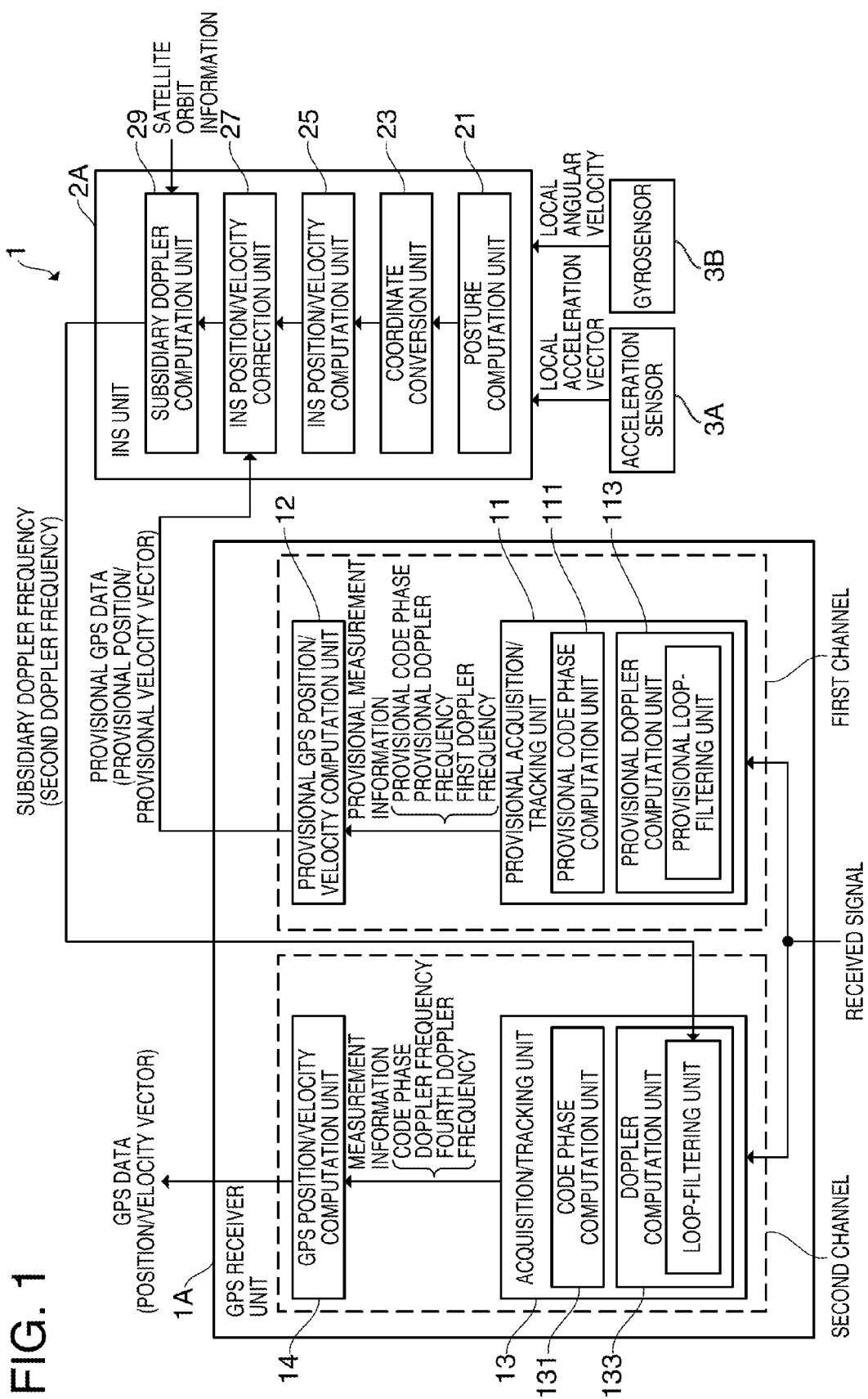
FIG. 1 is a diagram illustrating an exemplary system configuration of a first position computation system.

FIG. 1 is a diagram illustrating an exemplary system configuration of a first position computation system 1 for implementing the first position computation method according to the embodiment of the invention. The first position computation system 1 includes a GPS receiver unit 1A, an INS unit 2A, an acceleration sensor 3A, and a gyrosensor 3B.

The GPS receiver unit 1A is a functional unit for receiving a GPS satellite signal transmitted from the GPS satellite as one type of positioning satellite and carrying out position/velocity computation. The GPS satellite signal is a communication signal having a carrier frequency of 1.57542 [GHz] modulated based on a code division multiple access (CDMA) scheme known as a spread spectrum scheme using a coarse and acquisition (CA) code as one type of spread code. The CA code is a pseudo random noise signal having a repetition cycle of 1 ms by using a code length of 1023 chips as a single PN frame, and is different in each GPS satellite.

The GPS receiver unit 1A carries out carrier removal for removing a carrier (carrier wave) from the received carrier signal received by an RF receiver circuit unit (not shown), which receives radio frequency (RF) signals including the GPS satellite signal, and correlation between the received code signal with the carrier removed and the replica code to acquire the GPS satellite signal. The replica code is a pseudo CA code generated inside the apparatus. Specifically, three kinds of replica codes including Early, Prompt, and Late are generated with different time (phase). In addition, correlations between the received signal and each of the three kinds of replica codes are performed.

The GPS receiver unit 1A computes and obtains measurement information using the correlation values obtained from the correlations. The measurement information includes measurement data regarding the satellite signal used to carry out position computation or velocity computation. In the present embodiment, it is assumed that the two kinds of measurement data including the "code phase" and the "Doppler frequency" are included in the measurement information.

The code phase is a phase of the received CA code and is used to compute a pseudo distance from the GPS satellite. The Doppler frequency is a difference in the carrier frequency of the received frequency generated when a relative positional relationship from the GPS satellite is changed, and is used to compute relative velocity from the GPS satellite.

The GPS receiver unit 1A has two channels including a first channel having a provisional acquisition/tracking unit 11 and a provisional GPS position/velocity computation unit 12 and a second channel having an acquisition/tracking unit 13 and a GPS position/velocity computation unit 14. The first channel is a channel for computing the provisional GPS data as provisional GPS data. The provisional GPS data are data computed for use in the INS unit 2A and are different from the GPS data as a final output result. The provisional GPS data may be referred to as intermediate data for use in the INS unit 2A.

The provisional acquisition/tracking unit 11 includes a provisional code phase computation unit 111 and a provisional-Doppler computation unit 113. In the present embodiment, the code phase computed by the provisional code phase computation unit 111 is referred to as a "provisional code phase," and the Doppler frequency computed by the provisional-Doppler computation unit 113 is referred to as a "provisional Doppler frequency." In addition, they are collectively referred to as "provisional measurement information."

In contrast, the second channel is a channel for computing GPS data as a final output result. The GPS data may be referred to as final data for final output. The acquisition/tracking unit 13 includes a code phase computation unit 131 and a Doppler computation unit 133. In the present embodiment, the code phase computed by the code phase computation unit 131 is referred to as a "code phase," and the Doppler frequency computed by the Doppler computation unit 133 is referred to as a "Doppler frequency." In addition, they are collectively referred to as "measurement information."

The provisional code phase computation unit 111 and the code phase computation unit 131 carry out the correlation between the received code signal and the replica code by shifting the phase of the replica code, and determine a peak in the correlation result to compute the code phase.

The provisional-Doppler computation unit 113 and the Doppler computation unit 133 compute the Doppler frequency using the received signal obtained by receiving the GPS satellite signal. The computation of the Doppler frequency may be implemented using various techniques. As an exemplary technique, the carrier is removed from the received carrier signal by changing the frequency of the carrier removal signal. Peak determination is made for the correlation sum value obtained by carrying out the correlation between the received code signal with the carrier removed and the replica code and summing the correlation results. This operation corresponds to correlation in the frequency direction (frequency search). A difference between a frequency of the carrier removal signal corresponding to the peak of the correlation sum value and the carrier frequency is a desired Doppler frequency.

As another exemplary technique, the Doppler frequency may be computed by loop-filtering the received signal of the GPS satellite signal. The loop-filtering is implemented as a feed-back control process for the control target operation to track the carrier. In this case, for example, a numerical controlled oscillator for generating the carrier removal signal serves as a control target.

The loop-filtering may be implemented by a phase locked loop (PLL) process, a frequency locked loop (FLL), an incoherent summation process, or a combination of those processes. In the present embodiment, it is assumed that the Doppler frequency is computed, for example, using a loop-filtering process.

The provisional-Doppler computation unit 113 includes, as a functional unit, a provisional loop-filtering unit and carries out a provisional loop-filtering process for the received signal of the GPS satellite signal using a provisional loop bandwidth (first loop bandwidth) to compute the provisional Doppler frequency (first Doppler frequency). The provisional loop bandwidth may be set to, for example, 4 Hz. The provisional Doppler frequency computed by the provisional-Doppler computation unit 113 corresponds to the first Doppler frequency.

The Doppler computation unit 133 includes, as a functional unit, a loop-filtering unit and carries out a loop-filtering process for the received signal of the GPS satellite signal using a loop bandwidth (second loop bandwidth) narrower than the provisional loop bandwidth (first loop bandwidth). In addition, the Doppler computation unit 133 computes a final Doppler frequency using the result of the loop-filtering process and a subsidiary Doppler frequency (second Doppler frequency), which will be described below. The loop bandwidth is set to, for example, 1 Hz which is narrower than the provisional loop bandwidth. The Doppler frequency computed by the Doppler computation unit 133 corresponds to the fourth Doppler frequency.

The provisional loop-filtering process and the loop-filtering process are used as a loop process for controlling the frequency of the carrier removal signal to match with the frequency of the received carrier signal. While the carrier removal signal may have a frequency equal to the frequency of the received carrier signal, the frequency of the received carrier signal may fluctuate due to the Doppler effect or the like. This is the reason for the necessity of the tracking.

The carrier removal signal is generated, for example, by the NCO. In the provisional loop-filtering process and the loop-filtering process, the frequency of the carrier removal signal is tracked to the frequency of the received carrier signal by adjusting the oscillation frequency of the NCO. Therefore, the provisional loop-filtering process and the loop-filtering process may be referred to as a process of computing the Doppler frequency. In addition, although the received carrier signal may be converted into the intermediate frequency in the RF receiver circuit unit, the processing courses of the provisional loop-filtering process and the loop-filtering process are similar except that the frequency is different.

More specifically, the frequency $\omega$ of the received carrier signal can be expressed as a sum of the carrier frequency $\omega_c$ and the Doppler frequency $\omega_d$ ($\omega=\omega_c+\omega_d$). The NCO is controlled to, for example, reduce a difference between the frequency of the received carrier signal and the frequency of the carrier removal signal by slightly changing the frequency of the carrier removal signal with respect to the carrier frequency $\omega_c$. According to the equation above, the difference between the frequency of the received carrier signal and the frequency of the carrier removal signal corresponds to the Doppler frequency $\omega_d$. Therefore, it can be said that the loop-filtering process is equivalent to the computation of the Doppler frequency.

The provisional acquisition/tracking unit 11 outputs the provisional code phase computed by the provisional code phase computation unit 111 and the provisional Doppler frequency computed by the provisional-Doppler computation unit 113 to the provisional GPS position/velocity computation unit 12 as provisional measurement information. In addition, the provisional GPS position/velocity computation unit 12 computes the position and the velocity vector using the provisional measurement information. Computation of the position is implemented by the position computation using the code phase, and computation of the velocity vector is implemented by the velocity computation using the Doppler frequency. As such computation techniques are already known in the art, description using equations or the like will not be repeated.

The provisional GPS position/velocity computation unit 12 outputs the computed position and the computed velocity vector to the INS unit 2A as provisional GPS data including the provisional position and the provisional velocity vector.

The INS unit 2A is a function unit known as an inertial navigation system (inertial navigation apparatus) and carries out a predetermined inertial navigation operation using the signal from the sensor unit including at least the acceleration sensor 3A to compute the position and the velocity vector. In the inertial navigation operation, the velocity vector is computed using the signal from the acceleration sensor 3A, and the movement direction and the movement distance are obtained from the velocity vector to newly compute/update the position. In addition, the INS unit 2A computes a subsidiary Doppler frequency (second Doppler frequency) using the computed position and the velocity vector and the provisional position and the provisional velocity vector obtained from the GPS receiver unit 1A. Then, the computed subsidiary Doppler frequency is output to the GPS receiver unit 1A.

The acceleration sensor 3A is fixedly provided in the position computation system and measures and outputs acceleration in a local coordinate system with respect to a system itself (hereinafter, referred to as a local coordinate system). The inertial navigation operation is to obtain acceleration in an absolute coordinate system, typically called a terrestrial surface, for carrying out the inertial navigation operation (hereinafter, referred to as an absolute coordinate system). In consideration of this, in the present embodiment, the acceleration measured by the acceleration sensor 3A is converted into acceleration in the absolute coordinate system.

The coordinate change from the local coordinate system to the absolute coordinate system may be implemented using the movement direction or posture information of a system itself. The movement direction or the posture can be computed using a signal from an orientation sensor or an inertial sensor, called a gyrosensor. In the present embodiment, description will be made for a case where the coordinate value in the signal from the acceleration sensor 3A is changed using the signal from the gyrosensor 3B as an example.

In the following description, angular velocity and acceleration in the local coordinate system are referred to as "local angular velocity" and "local acceleration," respectively. In addition, since the acceleration has a direction and a magnitude, strictly speaking, the local acceleration is a local acceleration vector. In addition, the acceleration vector in the absolute coordinate system is referred to as an "absolute coordinate acceleration vector."

The INS unit 2A includes, as a functional unit, a posture computation unit 21, a coordinate conversion unit 23, an INS position/velocity computation unit 25, an INS position/velocity correction unit 27, and a subsidiary Doppler computation unit 29.

The posture computation unit 21 computes the latest posture angle by integrating the local angular velocity output from the gyrosensor 3B and successively adding the integration results. Here, the "integration" refers to a process of cumulatively adding values for a predetermined time period, and the "successive addition" means a process of summing the result obtained through the integration to the finally updated result.

More specifically, the posture computation unit 21 computes a change direction and a change amount of the posture angle for a predetermined time period by "integrating" the local angular velocity detected for the predetermined time period. The predetermined time period is set to be longer than the detection time interval of the angular velocity, typically, as a constant time period. For example, assuming that the predetermined time period is set to 100 milliseconds, the detection time interval of the angular velocity (more specifically, the sampling time interval of the signal output from the gyrosensor) is appropriately adjusted to 1 to 10 milliseconds, a change direction and a change amount of a posture angle of a mobile object are computed every 100 milliseconds regardless of the number of detection time intervals. The latest posture angle is computed by successively adding the change direction and the change amount of the posture angle (that is, integration result) computed every 100 milliseconds to the finally updated posture angle. Hereinafter, the latest posture determined by the latest posture angle is referred to as "estimated posture."

The coordinate conversion unit 23 carries out a coordinate conversion process for converting the local acceleration vector as a signal from the acceleration sensor 3A to an absolute coordinate acceleration vector based on the estimated posture computed by the posture computation unit 21.

More specifically, the coordinate conversion unit 23 computes a coordinate conversion matrix from the local coordinate system to the absolute coordinate system using the posture angle and converts the local acceleration vector to the absolute coordinate acceleration vector using the coordinate conversion matrix. Since the coordinate conversion matrix from the local coordinate system to the absolute coordinate system is already known in the art, description using equations or the like will be omitted.

The INS position/velocity computation unit 25 integrates and successively adds the absolute coordinate acceleration vector converted by the coordinate conversion unit 23 to compute the velocity vector. In addition, the position is newly computed/updated by adding the computed velocity vector to the previous (latest) position.

The INS position/velocity correction unit 27 corrects the position and the velocity vector computed by the INS position/velocity computation unit 25 using the provisional position and the provisional velocity vector obtained from the provisional GPS position/velocity computation unit 12. The correction method may be appropriately set, and, for example, correction using a Kalman filter may be applied.

The Kalman filter is a technique of estimating a probable condition by repeating a prediction process (time update) and a correction process (observation update) for a desired system condition. In this case, the system position and the velocity vector are used as the condition estimation values to be estimated. For example, in the prediction process, prediction of the condition estimation value is performed considering the position and the velocity vector computed by the INS position/velocity computation unit 25. In the correction process, the predicted condition estimation values are corrected using the provisional position and the provisional velocity vector as the observation value (external observation amount) obtained from the GPS receiver unit 1A. In addition, since the Kalman filter is already known in the art, description using equations or the like will be omitted.

Alternatively, correction using an averaging process may be performed as another correction technique. For example, a simple arithmetic averaging between the position and the velocity vector computed by the INS position/velocity computation unit 25 and the provisional position and the provisional velocity vector computed by the provisional GPS position/velocity computation unit 12 may be performed. In addition, a weighted averaging may be performed by increasing a weight factor of any one part. For example, a weight factor of the position/velocity vector is set to 99%, and a weight factor of the provisional position/provisional velocity vector is set to 1%, whereby correction may be made so that the only 1% of the GPS results are reflected.

The subsidiary Doppler computation unit 29 computes a subsidiary Doppler frequency using the position and the velocity vector corrected by the INS position/velocity correction unit 27. The subsidiary Doppler frequency corresponds to the second Doppler frequency.

The subsidiary Doppler computation unit 29 computes the viewing direction directed to the GPS satellite using the latest satellite position obtained from the satellite orbit information and the latest position corrected by the INS position/velocity correction unit 27. In addition, a relative velocity vector from the GPS satellite is computed using the latest velocity vector corrected by the INS position/velocity correction unit 27 and the latest satellite velocity vector obtained from the satellite orbit information. In addition, the subsidiary Doppler frequency is obtained by projecting the relative velocity vector into the viewing direction and converting it into a frequency. The subsidiary Doppler frequency (second Doppler frequency) is output to the Doppler computation unit 133.

The GPS receiver unit 1A tracks the GPS satellite signal using the subsidiary Doppler frequency obtained from the INS unit 2A. The subsidiary Doppler frequency is a Doppler frequency used to acquire the GPS satellite signal, and may be regarded as assistant information supplied from the INS unit 2A.

In the present embodiment, the Doppler computation unit 133 carries out the loop-filtering process for the received signal obtained by receiving the GPS satellite signal. In addition, the Doppler computation unit 133 computes the final Doppler frequency (fourth Doppler frequency) using the result of the loop-filtering process and the subsidiary Doppler frequency (second Doppler frequency).

The acquisition/tracking unit 13 outputs the code phase computed by the code phase computation unit 131 and the Doppler frequency computed/corrected by the Doppler computation unit 133 to the GPS position/velocity computation unit 14 as the measurement information.

The GPS position/velocity computation unit 14 computes the position and the velocity vector using the measurement information obtained from the acquisition/tracking unit 13. In addition, the computed position and the velocity vector are output as the GPS data corresponding to a final result.

1-2. Second Position Computation Method

Figure 2:
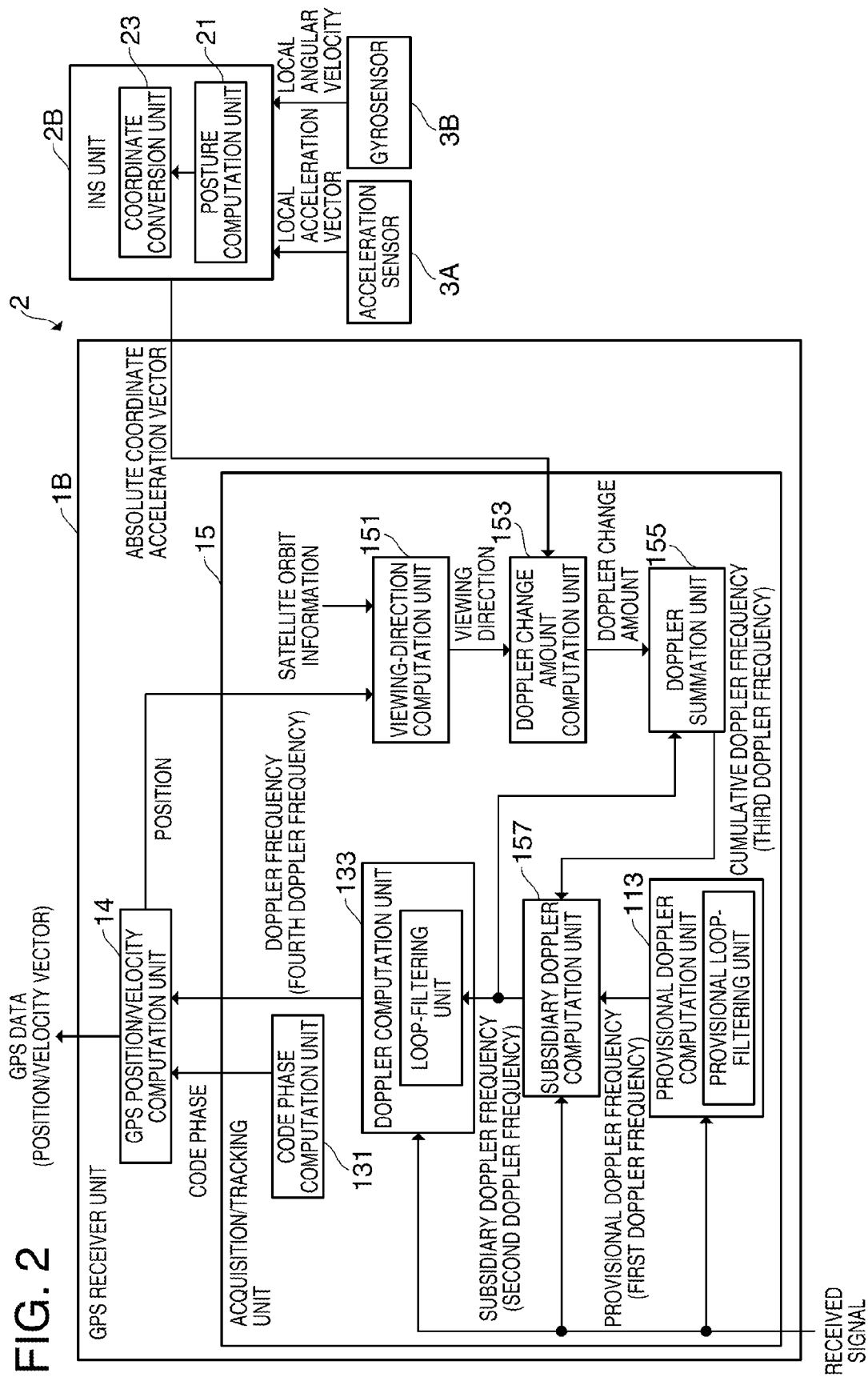
FIG. 2 is a diagram illustrating an exemplary system configuration of a second position computation system.

FIG. 2 is a diagram illustrating an exemplary system configuration of the second position computation system 2 for implementing a second position computation method according to the present embodiment. In addition, like reference numerals denote like elements in the same functional units as those of the first position computation system 1, and description thereof will not be repeated.

The second position computation system 2 is common to the first position computation system 1 in that the GPS satellite signal is acquired and tracked using the more accurate Doppler frequency. In the first position computation system 1, the subsidiary Doppler frequency is computed by reflecting the computation result of the GPS on the computation result of the INS, and the subsidiary Doppler frequency is fed back to the GPS and used to compute the final Doppler frequency. That is, the position and the velocity vector are appropriately obtained by coupling the GPS and the INS, and are used to indirectly obtain the subsidiary Doppler frequency.

In contrast, in the second position computation system 2, the subsidiary Doppler frequency is computed by reflecting the computation result of the INS on the computation result of the GPS unlike the first position computation system 1 in which the subsidiary Doppler frequency is obtained using the position and the velocity vector. That is, although both systems are the same in that the subsidiary Doppler frequency is computed, the subsidiary Doppler frequency is directly obtained by coupling the INS and the GPS unlike the first position computation system 1 in which the position and the velocity vector are obtained by coupling the INS and the GPS and then the subsidiary Doppler frequency is indirectly obtained.

The second position computation system 2 includes a GPS receiver unit 1B and an INS unit 2B. The GPS receiver unit 1B includes, as a functional unit, an acquisition/tracking unit 15 and a GPS position/velocity computation unit 14. In addition, the acquisition/tracking unit 15 includes a provisional-Doppler computation unit 113, a code phase computation unit 131, a Doppler computation unit 133, a view-direction computation unit 151, a Doppler change amount computation unit 153, a Doppler summation unit 155, and a subsidiary Doppler computation unit 157.

The view-direction computation unit 151 computes the viewing direction directed to the GPS satellite using the latest position computed by the GPS position/velocity computation unit 14 and the latest satellite position of the GPS satellite obtained from the satellite orbit information. The viewing direction is output to the Doppler change amount computation unit 153.

The Doppler change amount computation unit 153 computes the change amount of the velocity vector for a predetermined time period by integrating the absolute coordinate acceleration vector output from the INS unit 2B for the predetermined time period. In addition, the Doppler change amount computation unit 153 computes the change amount of the Doppler frequency (hereinafter, referred to as a "Doppler change amount") using the change amount of the computed velocity vector, the change amount of the satellite velocity vector obtained from the satellite orbit information, and the viewing direction computed by the view-direction computation unit 151. The Doppler change amount is output to the Doppler summation unit 155.

The Doppler summation unit 155 successively adds the Doppler change amount computed by the Doppler change amount computation unit 153 to the latest subsidiary Doppler frequency (second Doppler frequency) computed by the subsidiary Doppler computation unit 157 to compute a cumulative Doppler frequency. The cumulative Doppler frequency is output to the subsidiary Doppler computation unit 157. The cumulative Doppler frequency corresponds to the third Doppler frequency.

The subsidiary Doppler computation unit 157 computes the subsidiary Doppler frequency (second Doppler frequency) by synthesizing the provisional Doppler frequency (first Doppler frequency) computed by the provisional-Doppler computation unit 113 and the cumulative Doppler frequency (third Doppler frequency) computed by the Doppler summation unit 155.

The weight factor used to synthesize the Doppler frequency may be appropriately set. In the present embodiment, the weight factor of the cumulative Doppler frequency (third Doppler frequency) is larger than that of the provisional Doppler frequency (first Doppler frequency) to be synthesized. The cumulative Doppler frequency is regarded as a precise Doppler frequency obtained by successively adding the Doppler change amount to the latest subsidiary Doppler frequency with higher reliability than that of the provisional Doppler frequency. For example, the synthesizing ratio is set to (provisional Doppler frequency:cumulative Doppler frequency=1:99), so that synthesis is performed by reflecting the provisional Doppler frequency only by 1%.

The Doppler computation unit 133 computes a final Doppler frequency (fourth Doppler frequency) using the result of the loop-filtering process and the subsidiary Doppler frequency (second Doppler frequency) computed by the subsidiary Doppler computation unit 157. In addition, the acquisition/tracking unit 15 outputs the code phase computed by the code phase computation unit 131 and the Doppler frequency computed by the Doppler computation unit 133 to the GPS position/velocity computation unit 14 as measurement information.

The GPS position/velocity computation unit 14 computes the position and the velocity vector using the measurement information obtained from the acquisition/tracking unit 15. In addition, the GPS position/velocity computation unit 14 outputs such data as the final GPS data.

2. Examples

Next, an example of an electronic apparatus having the position computation system described according to the principle will be described. Here, a car navigation apparatus mounted in a four-wheel vehicle as one type of mobile object will be exemplarily described.

Figure 3:
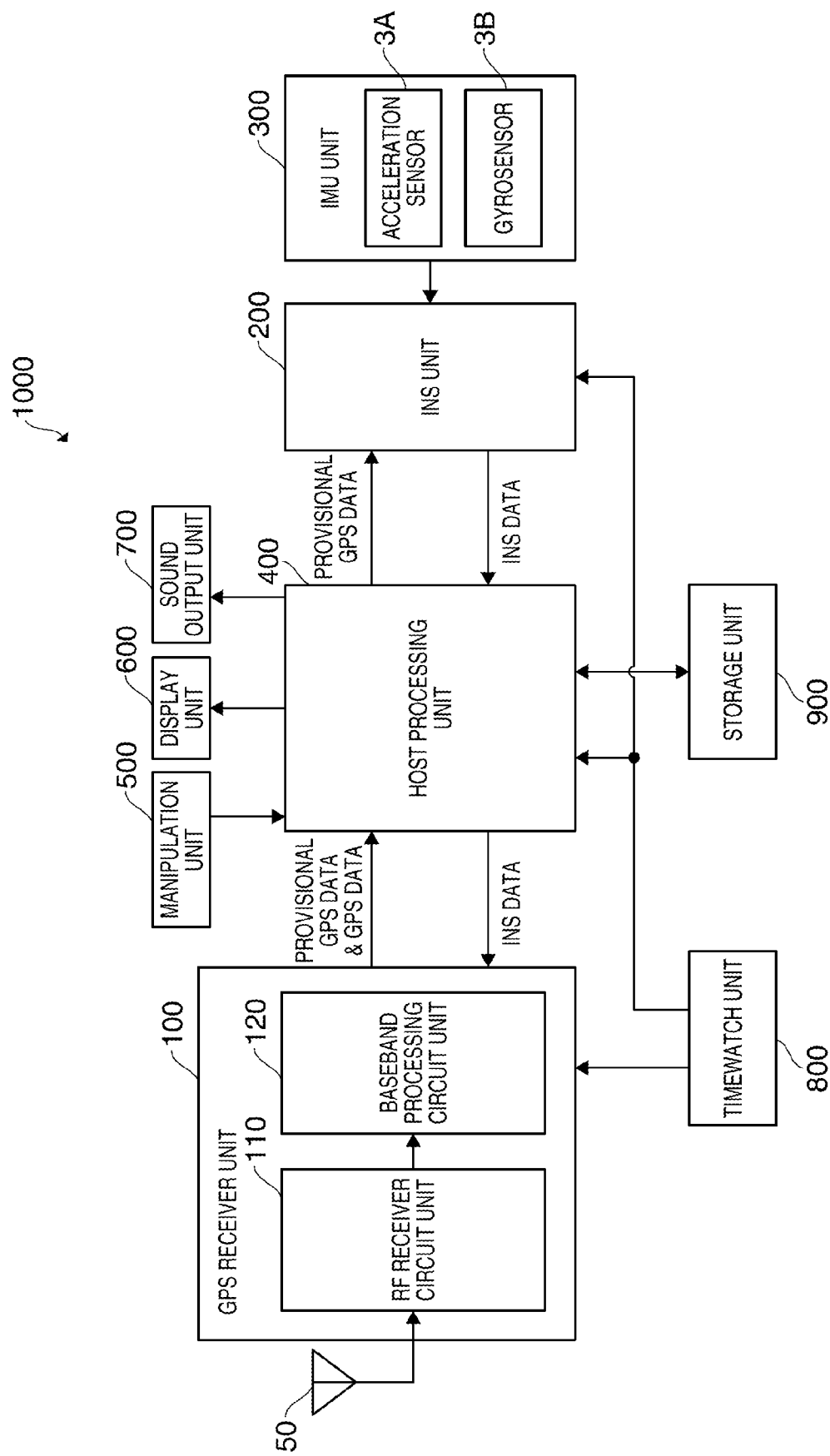
FIG. 3 is a block diagram illustrating an exemplary functional configuration of a car navigation apparatus.

FIG. 3 is a block diagram illustrating an exemplary functional configuration of the car navigation apparatus 1000 commonly applied to each example. The car navigation apparatus 1000 includes a GPS antenna 50, a GPS receiver unit 100, an INS unit 200, an IMU unit 300, a host processing unit 400, a manipulation unit 500, a display unit 600, a sound output unit 700, a time-watch unit 800, and a storage unit 900.

The GPS antenna 50 is an antenna that receives the RF signal including the GPS satellite signal transmitted from the GPS satellite and outputs the received signal to the GPS receiver unit 100.

The GPS receiver unit 100 is a circuit unit for processing the received signal of the GPS satellite signal output from the GPS antenna 50, and also a functional block corresponding to the GPS receiver. The GPS receiver unit 100 includes an RF receiver circuit unit 110 and a baseband processing circuit unit 120. In addition, the RF receiver circuit unit 110 and the baseband processing circuit unit 120 may be manufactured as either different large-scale integration (LSI) chips or a single chip.

The baseband processing circuit unit 120 carries out carrier removal or correlation for the received signal output from the RF receiver circuit unit 110 to acquire the GPS satellite signal. In addition, the position and the velocity vector of the vehicle are computed using the satellite orbit data or the timing data extracted from the GPS satellite signal, and the computation result is output to the host processing unit 400.

Figure 4:
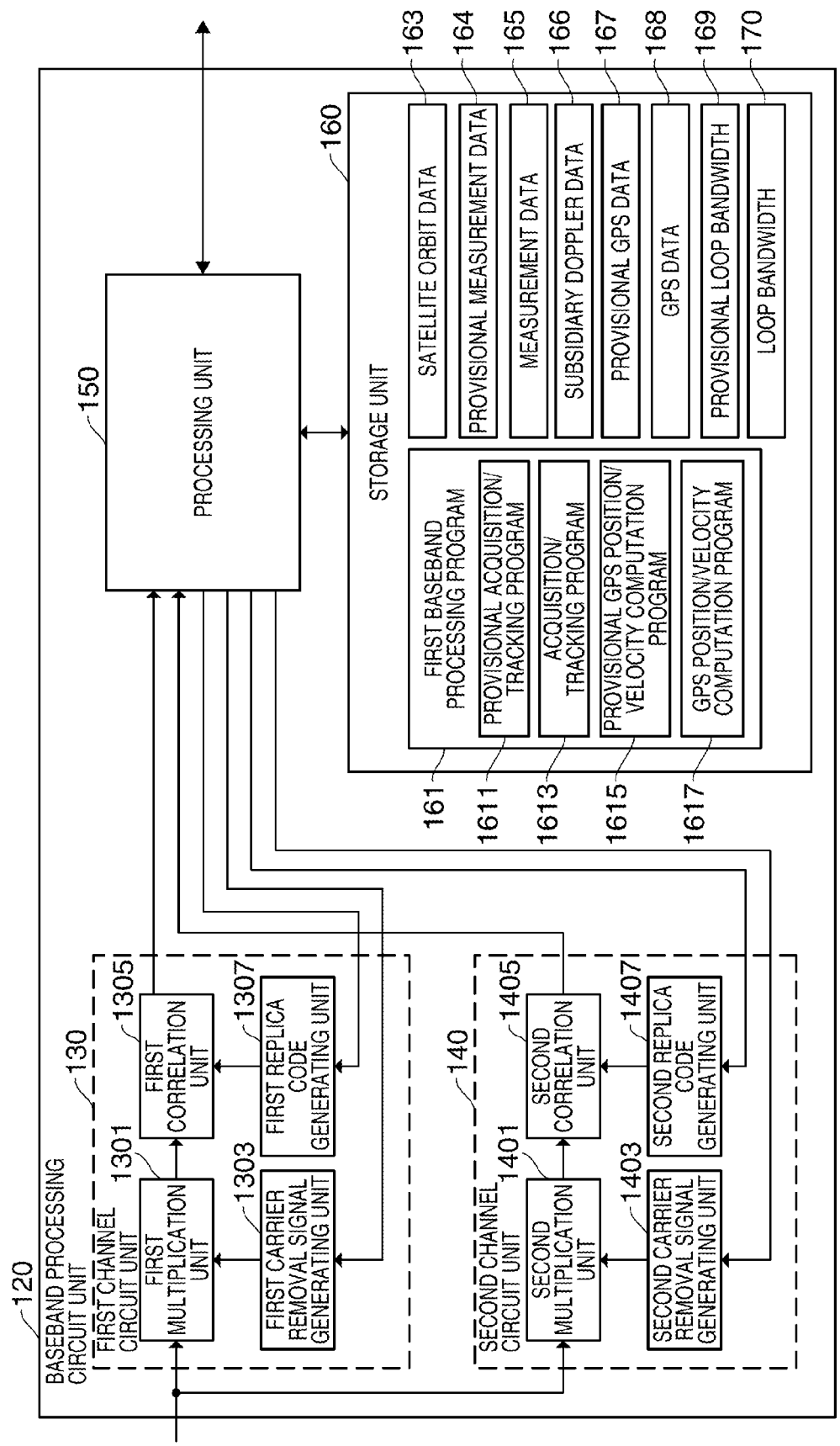
FIG. 4 is a diagram illustrating an exemplary circuit configuration of a baseband processing circuit unit.

FIG. 4 is a diagram illustrating an exemplary circuit configuration of the baseband processing circuit unit 120 by focusing on the circuit block according to the present example. The baseband processing circuit unit 120 includes a first system circuit unit 130, a second system circuit unit 140, a processing unit 150, and a storage unit 160.

The first system circuit unit 130 includes a first multiplication unit 1301, a first carrier removal signal generating unit 1303, a first correlation computation unit 1305, and a first replica code generating unit 1307. In addition, the second system circuit unit 140 includes a second multiplication unit 1401, a second carrier removal signal generating unit 1403, a second correlation computation unit 1405, and a second replica code generating unit 1407.

The first and second multiplication units 1301 and 1401 including a multiplier or the like are circuit units for demodulating the received code signal by removing the carrier frequency component of the received carrier signal by multiplying the first and second carrier removal signals generated from the first and second carrier removal signal generating units 1303 and 1403, respectively, by the received carried signal.

The first and second carrier removal signal generating units 1303 and 1403 including an oscillator such as a carrier NCO and the like are circuits for generating the carrier removal signal having a frequency corresponding to the frequency of the received carrier signal. The first and second carrier removal signal generating units 1303 and 1403 generate the signal based on the Doppler frequency and the provisional Doppler frequency output from the processing unit 150 and output the signal to each of the first and second multiplication units 1301 and 1401.

In addition, in a case where the signal output from the RF receiver circuit unit 110 is an IF signal, the carrier removal signal having an IF frequency is generated. As such, the present example can be substantially similarly applicable to even a case where the RF receiver circuit unit 110 down-converts the received signal to the IF signal.

The first and second correlation computation units 1305 and 1405 including a plurality of correlators are circuit units for operating correlation between the received code signals output from the first and second multiplication units 1301 and 1401, respectively, and the replica codes generated by the first and second replica code generating units 1307 and 1407, respectively.

The first and second correlation computation units 1305 and 1405 operate correlation between each of the IQ components of the received signal and the replica code inputted from the first and second replica code generating units 1307 and 1407, respectively. Although a circuit block for separating the IQ components (IQ separation) in the received signal is not illustrated, any circuit block is applicable. For example, the IQ separation can be performed by multiplying a local oscillation signal of which the phase is shifted by 90° by the received signal when the RF receiver circuit unit 110 down-converts the received signal into the IF signal.

The first and second replica code generating units 1307 and 1407 including an oscillator such as a code NCO and the like are circuit units for generating the replica code obtained by simulating the CA code. The first and second replica code generating units 1307 and 1407 delay the replica code corresponding to the PRN number (satellite number) instructed from the processing unit 150 by a phase delay amount (time) instructed from the processing unit 150 and outputs the delayed replica code to the first and second correlation computation units 1305 and 1405.

The processing unit 150 including a processor such as a central processing unit (CPU) and the like is a control unit for collectively controlling each of the RF receiver circuit unit 110 or the baseband processing circuit unit 120 according to various programs stored in the storage unit 160.

The storage unit 160, including a storage device such as a read-only memory (ROM), a flash ROM, a random access memory (RAM), and the like, stores programs or data used to execute various processes such as the acquisition/tracking process of the GPS satellite signal or the GPS position/velocity computation process. In addition, the storage unit 160 has a work area for temporarily storing data in the course of various processes or the processing results.

Figure 5:
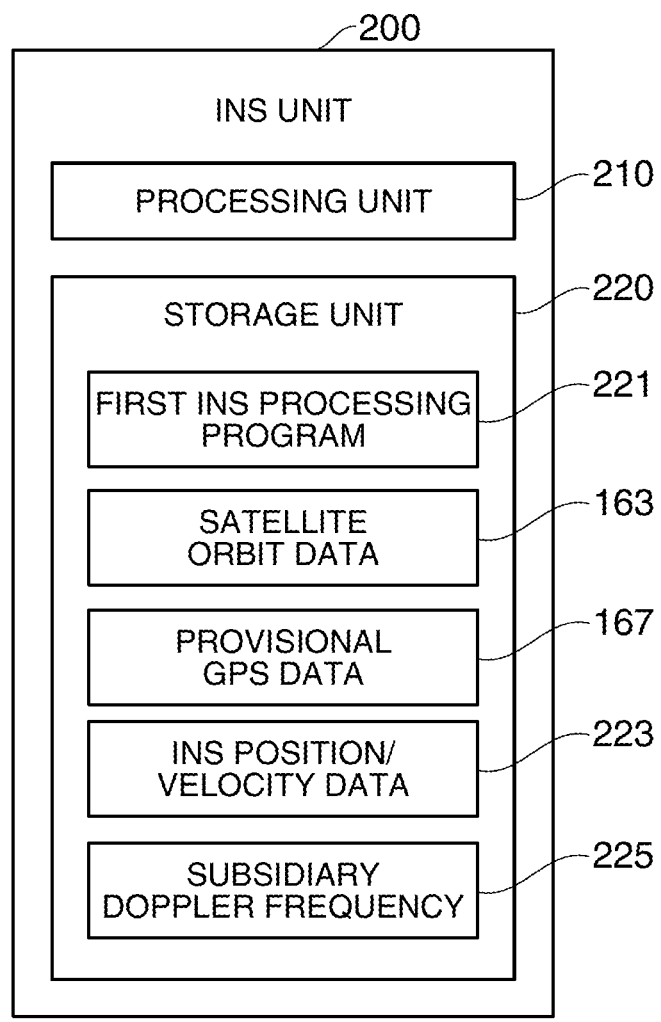
FIG. 5 is a diagram illustrating an exemplary functional configuration of an INS unit.

Returning to description of the functional blocks of FIG. 3, the INS unit 200 is a module known as an inertial navigation system or an inertial navigation apparatus. An exemplary functional configuration thereof is illustrated in FIG. 5. The INS unit 200 includes a processing unit 210 and a storage unit 220.

The IMU unit 300 is a sensor unit known as an inertial measurement unit and includes an acceleration sensor 3A as one type of inertial sensor and a gyrosensor 3B. The detection result of the IMU unit 300 is output to the INS unit 200 whenever necessary.

The host processing unit 400, including a processor such as a CPU and the like, is a control unit for collectively controlling each unit of the car navigation apparatus 1000. The host processing unit 400 transfers the provisional GPS data output from the GPS receiver unit 100 to the INS unit 200 or transfers the INS data output from the INS unit 200 to the GPS receiver unit 100. In addition, the host processing unit 400 carries out a process of displaying a map indicating the current position of a vehicle on the display unit 600 based on the GPS data output from the GPS receiver unit 100 or a process of outputting the sound guidance for navigation from sound output unit 700.

The manipulation unit 500 is an input unit including, for example, a touch panel, a button switch, and the like and outputs a pressed key or a button signal to the host processing unit 400. Various instructions such as a destination are entered by manipulating the manipulation unit 500.

The display unit 600, including a liquid crystal display (LCD) and the like, is a display apparatus for displaying various kinds of information based on the display signal input from the host processing unit 400. The display unit 600 is used to display a navigation window and the like.

The sound output unit 700, including a loudspeaker and the like, is a sound output apparatus for outputting various sounds based on the sound output signal input from the host processing unit 400. The sound output unit 700 outputs sounds such as a guidance sound.

The time-watch unit 800 is an internal time-watch of the car navigation apparatus 1000 and includes an oscillation circuit such as a crystal oscillator. The clock time of the time-watch unit 800 is output to the GPS receiver unit 100, the INS unit 200, and the host processing unit 400 whenever necessary.

The storage unit 900 is a storage apparatus for storing various kinds of programs or data for implementing a system program of the car navigation apparatus 1000 or various functions such as a navigation function.

2-1. First Example

In the first example, the first position computation system 1 described in conjunction with "1-1 First Position Computation Method" is applied to a car navigation apparatus 1000.

2-1-1. Data Structure

As shown in FIG. 4, the storage unit 160 of the baseband processing circuit unit 120 of the first example stores the first baseband processing program 161 read by the processing unit 150 and executed in the first baseband process (refer to FIG. 9) as a program. The first baseband processing program 161 includes a provisional acquisition/tracking program 1611, an acquisition/tracking program 1613, a provisional GPS position/velocity computation program 1615, and a GPS position/velocity computation program 1617 as a subroutine.

In the first baseband process, the processing unit 150 carries out two kinds of processes including a provisional acquisition/tracking process and an acquisition/tracking process for each tracking target satellite and computes and tracks the provisional measurement information and the measurement information. In addition, the processing unit 150 computes the provisional GPS data by carrying out the provisional GPS position/velocity computation process using the provisional measurement information and computes the GPS data by carrying out the GPS position/velocity computation process using the measurement information. The first baseband process will be described in detail below using flowcharts.

The storage unit 160 stores satellite orbit data 163, provisional measurement data 164, measurement data 165, subsidiary Doppler data 166, provisional GPS data 167, GPS data 168, a provisional loop bandwidth 169, and a loop bandwidth 170 as data.

The satellite orbit data 163 are data such as an almanac for storing an outline of satellite orbit information on all GPS satellites and an ephemeris for storing detailed satellite orbit information for each GPS satellite. The satellite orbit data 163 may be obtained by decoding the GPS satellite signal received from the GPS satellite or obtained from assistant data from the assistant server of the car navigation apparatus 1000.

Figure 6:
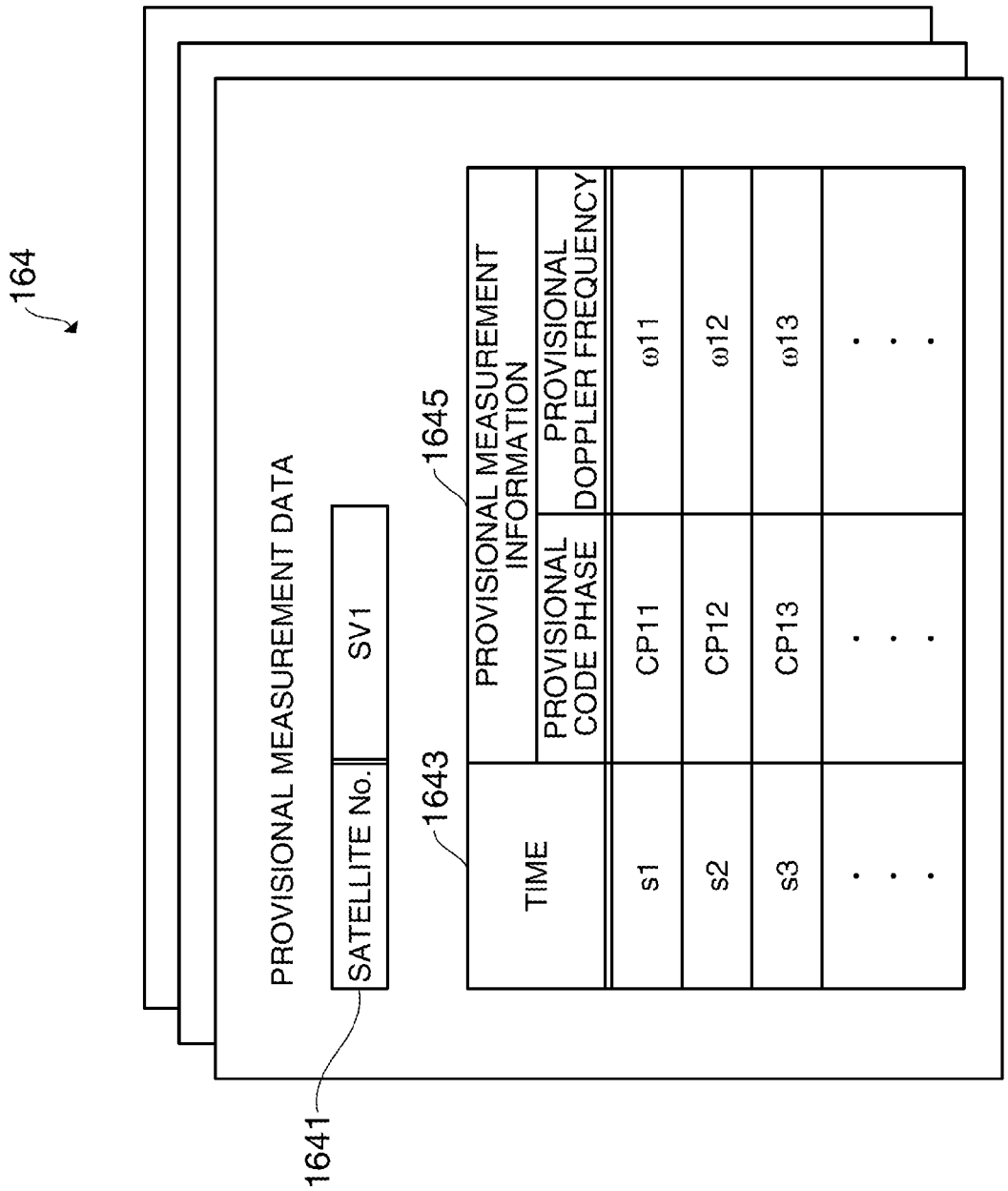
FIG. 6 is a diagram illustrating an exemplary data structure of provisional measurement data.

The provisional measurement data 164 are data for storing provisional measurement information for each satellite, and an exemplary data structure thereof is illustrated in FIG. 6. The provisional measurement data 164 stores the provisional measurement information 1645 for each time point 1643 in time series according to the tracking target satellite number 1641. The provisional measurement information includes the provisional code phase and the provisional Doppler frequency.

Figure 7:
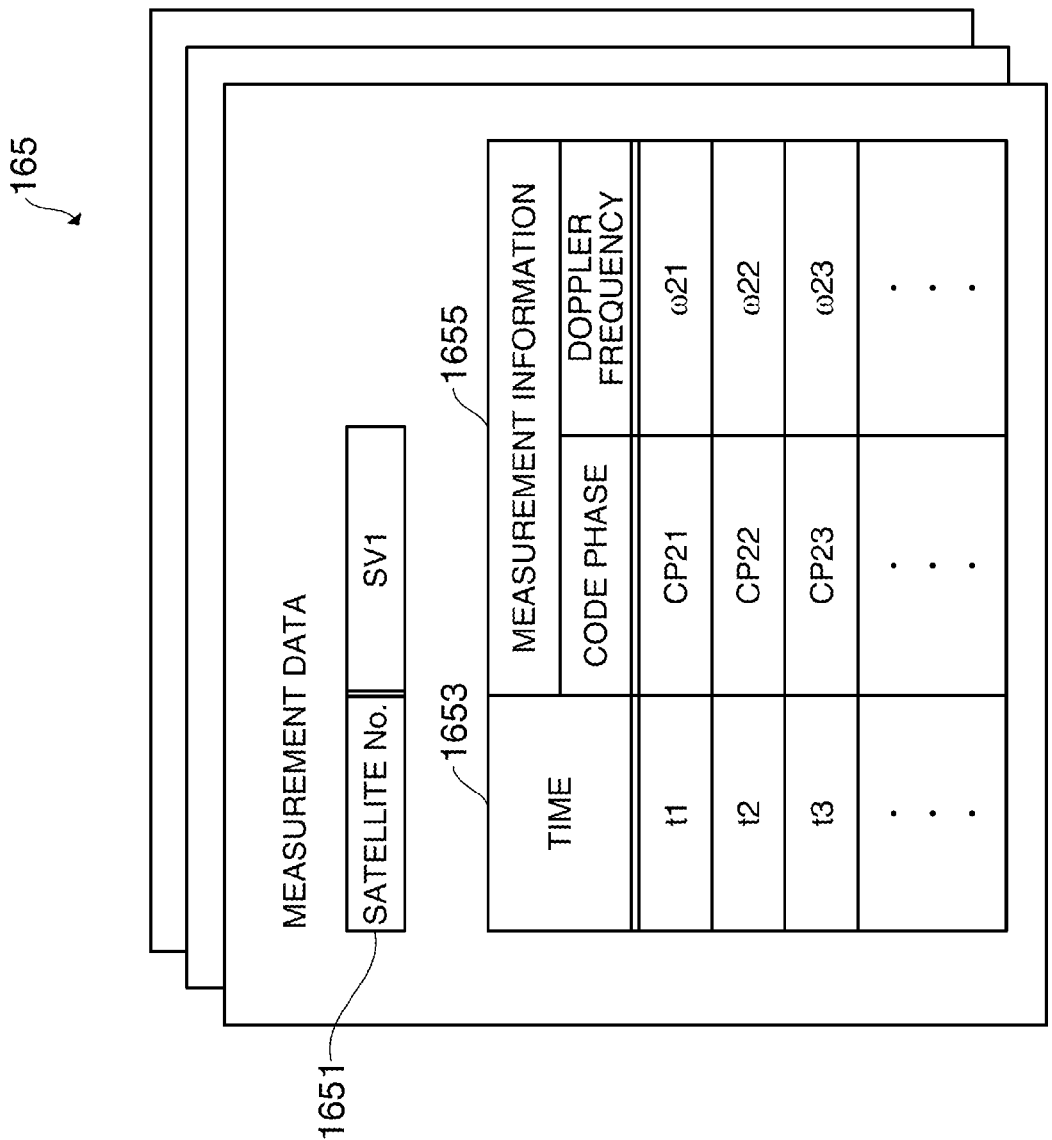
FIG. 7 is a diagram illustrating an exemplary data structure of measurement data.

The measurement data 165 stores measurement information for each satellite, and an exemplary data structure thereof is illustrated in FIG. 7. The measurement data 165 stores the measurement information 1655 for each time point 1653 in time series according to the tracking target satellite number 1651. The measurement information 1655 includes the code phase and the Doppler frequency.

Figure 8:
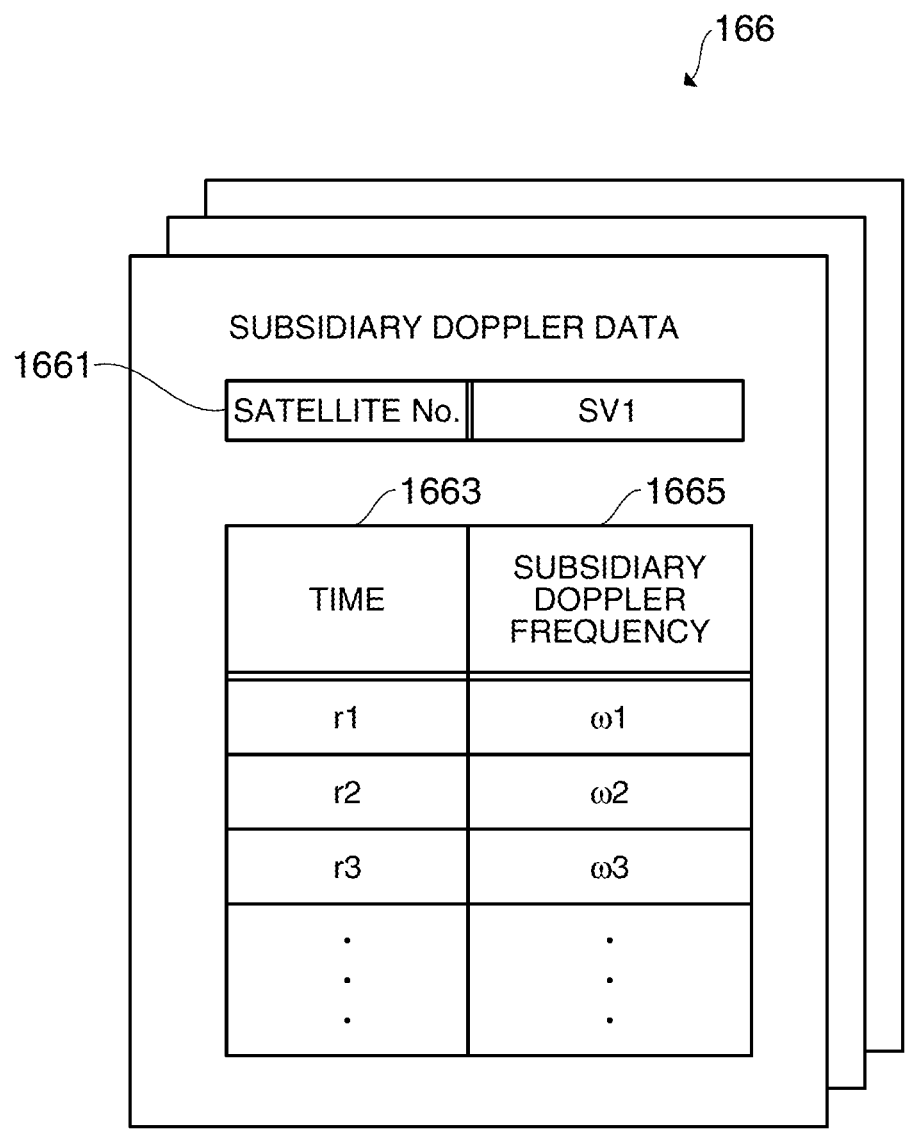
FIG. 8 is a diagram illustrating an exemplary data structure of subsidiary Doppler data.

The subsidiary Doppler data 166 stores the subsidiary Doppler frequency for each satellite, and an exemplary data structure is illustrated in FIG. 8. The subsidiary Doppler data 166 stores the subsidiary Doppler frequency 1665 for each time point 1663 in time series according to the tracking target satellite number 1661.

The provisional loop bandwidth 169 is a bandwidth used to carryout the provisional loop-filtering process, and is set to a predetermined value (for example, 4 Hz). In contrast, the loop bandwidth 170 is a bandwidth used to carry out the loop-filtering process, and is set to a value smaller than that of the provisional loop bandwidth (for example, 1 Hz).

As shown in FIG. 5, the storage unit 220 of the INS unit 200 stores the first INS processing program 221 read by the processing unit 210 and executed by the first INS process (refer to FIG. 10), satellite orbit data 163, provisional GPS data 167, INS position/velocity data 223, and a subsidiary Doppler frequency 225. The satellite orbit data 163 and the provisional GPS data 167 are the same as data of the aforementioned storage unit 160.

The first INS process is a process of computing the position and the velocity vector of a vehicle by carrying out the inertial navigation operation using the detection result of the IMU unit 300 in the processing unit 210. In addition, the position and the velocity vector are corrected using the provisional position and the provisional velocity vector obtained from the GPS receiver unit 100, and the subsidiary Doppler frequency is computed using the correction result and output to the GPS receiver unit 100. The first INS process will be described in detail below using the flowcharts.

2-1-2. Process Flow

Figure 9:
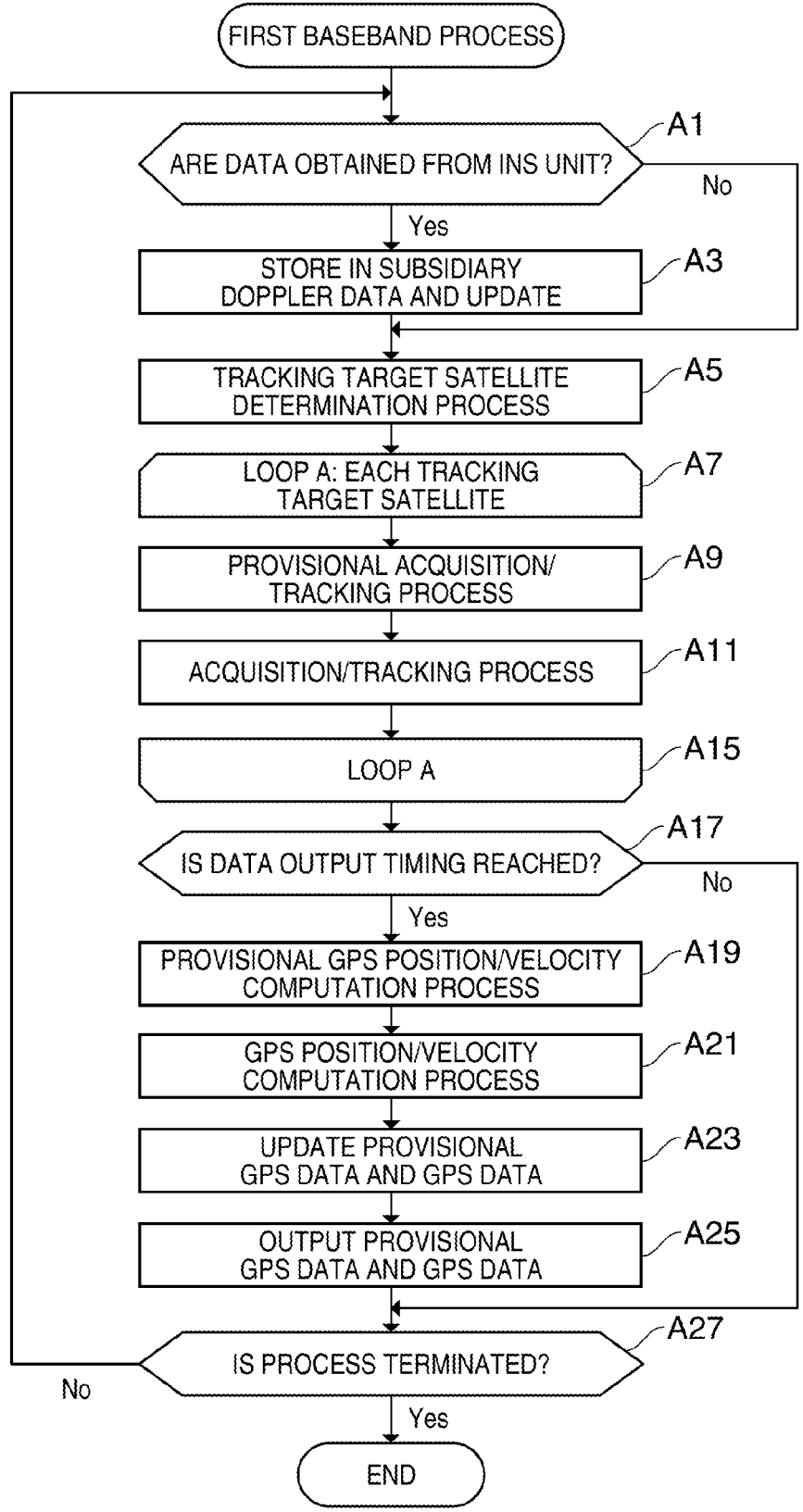
FIG. 9 is a flowchart illustrating a flow of a first baseband process.

FIG. 9 is a flowchart illustrating a flow of the first baseband process executed by the processing unit 150 of the baseband processing circuit unit 120 according to the first baseband processing program 161 stored in the storage unit 160.

First, the processing unit 150 determines whether or not the data of the subsidiary Doppler frequency is obtained from the INS unit 200 through the host processing unit 400 (step A1). If it is determined that the data of the subsidiary Doppler frequency is obtained (step A1: YES), the subsidiary Doppler frequency is updated and stored in the subsidiary Doppler data 166 of the storage unit 160 (step A3).

After the step A3, or if it is determined that the data of the subsidiary Doppler frequency is not obtained (step A1: NO), the processing unit 150 carries out tracking target satellite determination process (step A5). Specifically, at the current time point counted by the time-watch unit 800, a GPS satellite located in the roof of the sky at a predetermined reference position is determined using the satellite orbit data 163, and the tracking target satellite is determined. For example, the reference position may be a position obtained from the assistant server using so-called server assistance in the event of the initial position computation after power is supplied or a position finally computed before power cut-off. In addition, the reference position may be the latest computation position in the event of the second or subsequent position computation.

Then, the processing unit 150 carries out the process of the loop A for each tracking target satellite determined in step A5 (steps A7 to A15). In the process of the loop A, the processing unit 150 carries out the provisional acquisition/tracking process according to the provisional acquisition/tracking program 1611 stored in the storage unit 160 (step A9).

In the provisional acquisition/tracking process, the processing unit 150 carries out carrier removal and correlation in the first system circuit unit 130. In addition, the correlation values output from the first correlation computation unit 1305 are summed for a predetermined coherent summation time (for example, 20 milliseconds) to compute the coherent correlation sum value. In addition, the processing unit 150 further sums the coherent correlation sum values for a predetermined incoherent summation time (for example, 1 second) to compute an incoherent correlation sum value, determines a peak in the incoherent correlation sum value, and obtains a provisional code phase. In addition, a provisional loop-filtering process using the coherent correlation sum value is performed to compute the provisional Doppler frequency.

In a weak electric field environment or the like, since the received signal of the GPS satellite signal becomes a weak electric field signal, the correlation value computed by the correlation computation unit generally becomes a minute value, and the peak of the correlation value tends to be hidden. In this case, accuracy of the computed measurement information is degraded, and the position/velocity computation may not be appropriately performed. In this regard, in the provisional acquisition/tracking process, two kinds of correlative summations including coherent and incoherent summations are performed to exhibit the peak of the correlation value.

Then, the processing unit 150 carries out the acquisition/tracking process according to the acquisition/tracking program 1613 stored in the storage unit 160 (step A11). In addition, the processing unit 150 advances the process to the next tracking target satellite.

In the acquisition/tracking process, the processing unit 150 carries out carrier removal and correlation in the second system circuit unit 140. In addition, the correlation values output from the second correlation computation unit 140S are summed for a coherent summation time (for example, 20 milliseconds), and a peak is determined for the obtained coherent correlation sum value, and a final code phase is obtained. In addition, a loop-filtering process using the coherent correlation sum value is performed, and a final Doppler frequency is computed using the latest subsidiary Doppler frequency stored in the subsidiary Doppler data 166 and the result of the loop-filtering process.

In the acquisition/tracking process, since the Doppler frequency is computed using the result of the loop-filtering process and the subsidiary Doppler frequency, it is possible to obtain a precise Doppler frequency in comparison with the provisional acquisition/tracking process. In this regard, in the acquisition/tracking process, the incoherent summation performed in the provisional acquisition/tracking process is omitted, and only the coherent summation is performed. In addition, using the coherent correlation sum value obtained through the coherent summation, final measurement information is computed and obtained.

After the processes of steps A9 and A11 are performed for the tracking target satellite, the processing unit 150 terminates the process of the loop A (step A15). Then, if it is determined that the data output timing is reached (step A17: YES), the processing unit 150 carries out the provisional GPS position/velocity computation process according to the provisional GPS position/velocity computation program 1615 (step A19). In addition, the processing unit 150 carries out the GPS position/velocity computation process according to the GPS position/velocity computation program 1617 (step A21).

Then, the processing unit 150 updates the GPS data 168 and the provisional GPS data 167 in the storage unit 160 using the computation results of the provisional GPS position/velocity computation process and the GPS position/velocity computation process (step A23). In addition, the processing unit 150 outputs the provisional GPS data 167 and the GPS data 168 to the host processing unit 400 (step A25). The provisional GPS data 167 are supplied to the INS unit 200 through the host processing unit 400.

After step A25 or if it is determined that it is not the data output timing (step A17: NO), the processing unit 150 determines whether or not to terminate the process (step A27). If it is determined that the process is not terminated (step A27: NO), the process returns to step A1. Otherwise, if it is determined that the process is terminated (step A27: YES), the first baseband process is terminated.

Figure 10:
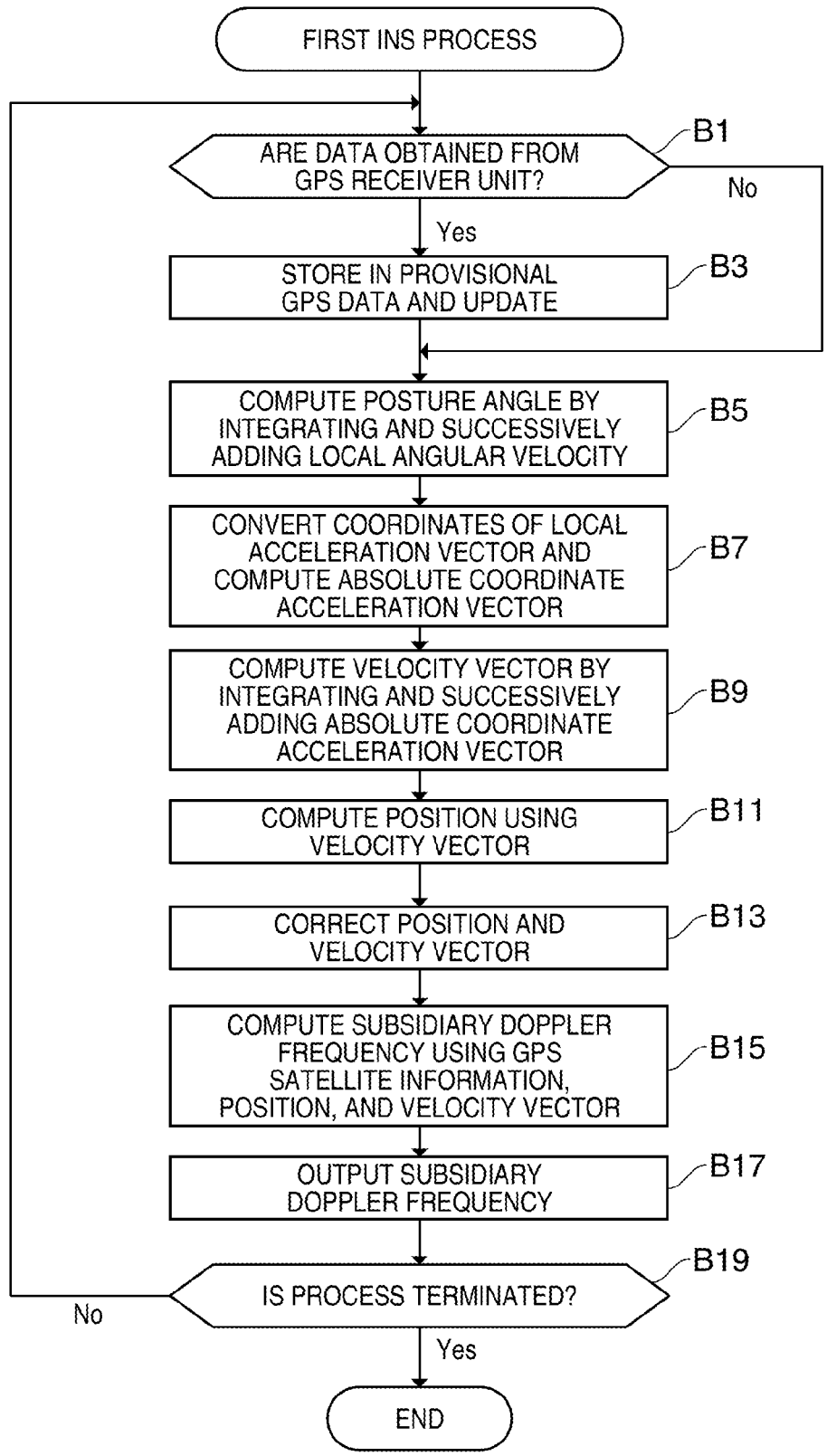
FIG. 10 is a flowchart illustrating a flow of a first INS process.

FIG. 10 is a flowchart illustrating a flow of the first INS process performed by the processing unit 210 of the INS unit 200 according to the first INS processing program 221 stored in the storage unit 220.

First, the processing unit 210 determines whether or not the provisional GPS data 167 is obtained from the GPS receiver unit 100 through the host processing unit 400 (step B1). If it is determined that the provisional GPS data 167 is obtained (step B1: YES), the provisional GPS data 167 of the storage unit 220 are updated and stored (step B3).

After step B3 or if it is determined that the provisional GPS data 167 is not obtained (step B1: NO), the processing unit 210 computes the posture angle by integrating and successively adding the local angular velocity detected by the gyrosensor 3B (step B5). In addition, the processing unit 210 carries out coordinate conversion for the local acceleration vector detected by the acceleration sensor 3A to compute the absolute coordinate acceleration vector (step B7).

Then, the processing unit 210 computes the velocity vector of the vehicle by integrating and successively adding the absolute coordinate acceleration vector (step B9). In addition, the processing unit 210 newly computes the position of a vehicle by adding the computed velocity vector to the latest computation position (step B11). The processing unit 210 stores the velocity vector and the position computation result in the INS position/velocity data 223 of the storage unit 220.

Then, the processing unit 210 corrects the position and the velocity vector computed in steps B7 and B9 using the latest provisional position and the latest provisional velocity vector stored in the provisional GPS data 167 (step B13). In addition, the processing unit 210 computes the subsidiary Doppler frequency 225 using the latest satellite position and the latest satellite velocity vector obtained from the corrected position, the velocity vector, and the satellite orbit data 163 (step B15). In addition, the processing unit 210 outputs the subsidiary Doppler frequency 225 to the host processing unit 400 (step B17).

Next, the processing unit 210 determines whether or not the process is terminated (step B19). If it is determined that the process is not terminated (NO in step B19), the process returns to step B1. Otherwise, if it is determined that the process is terminated (YES in step B19), the first INS process is terminated.

2-2. Second Example

The second example is an example for applying the second position computation system 2 described in "1-2. Second Position Computation Method" to a car navigation apparatus 1000. In the second example, like reference numerals denote like functional configurations, data structures, process steps as in the first example, and description thereof will be omitted.

2-2-1. Data Structure

Figure 11:
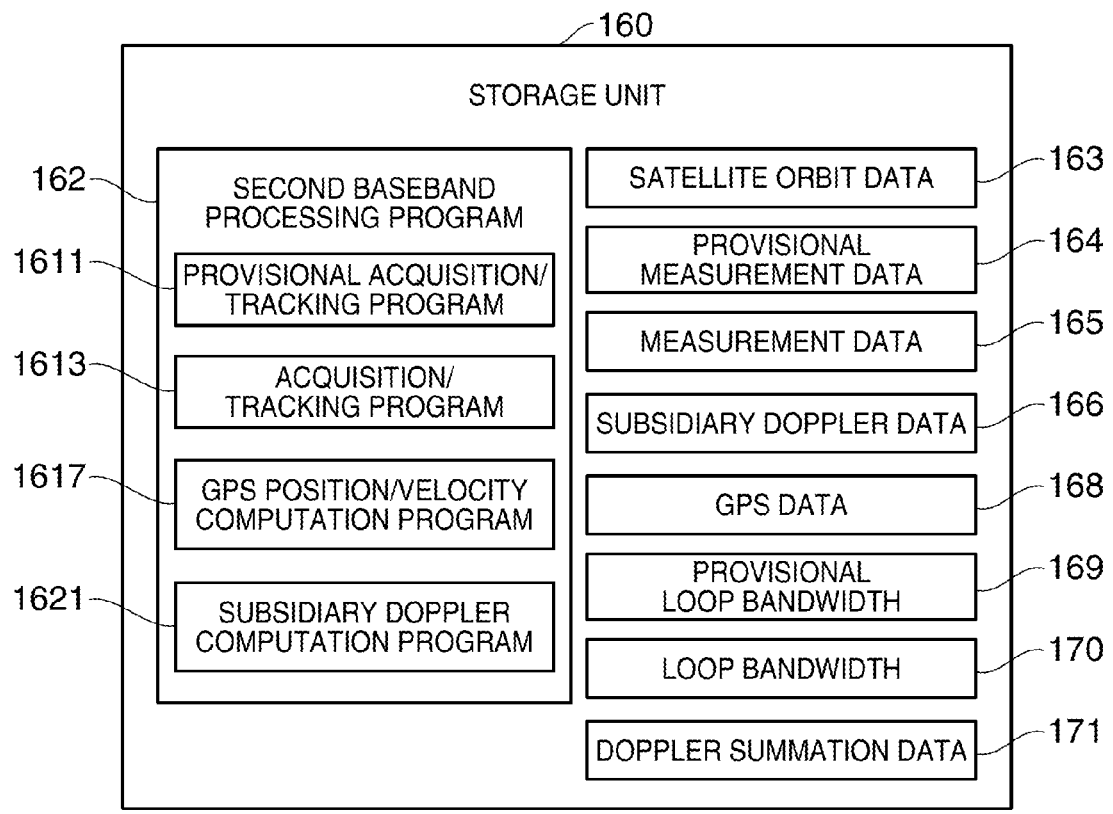
FIG. 11 illustrates an exemplary data structure of a storage unit in a baseband processing circuit unit according to a second embodiment.

FIG. 11 is a diagram illustrating an exemplary data structure of the storage unit 160 of the baseband processing circuit unit 120 according to the second example. The storage unit 160 stores a second baseband processing program 162 executed in the second baseband process (refer to FIG. 14) as a program. The second baseband processing program 162 includes, as a subroutine, a provisional acquisition/tracking program 1611, an acquisition/tracking program 1613, a GPS position/velocity computation program 1617, and a subsidiary Doppler computation program 1621.

In addition, the storage unit 160 stores satellite orbit data 163, provisional measurement data 164, measurement data 165, subsidiary Doppler data 166, GPS data 168, a provisional loop bandwidth 169, a loop bandwidth 170, and Doppler summation data 171 as data.

FIG. 12 is a diagram illustrating an exemplary data structure of the Doppler summation data. The Doppler summation data 171 sequentially stores the absolute coordinate acceleration vector 1713 output from the INS unit 200 to match with the time 1711.

FIG. 13 is a diagram illustrating exemplary data stored in the storage unit 220 of the INS unit 200 according to the second example. The storage unit 220 stores the second INS processing program 222 executed as a second INS process (refer to FIG. 15) and absolute coordinate acceleration vector data 227 obtained by converting coordinates of the local acceleration vector.

2-2-2. Process Flow

Figure 14:
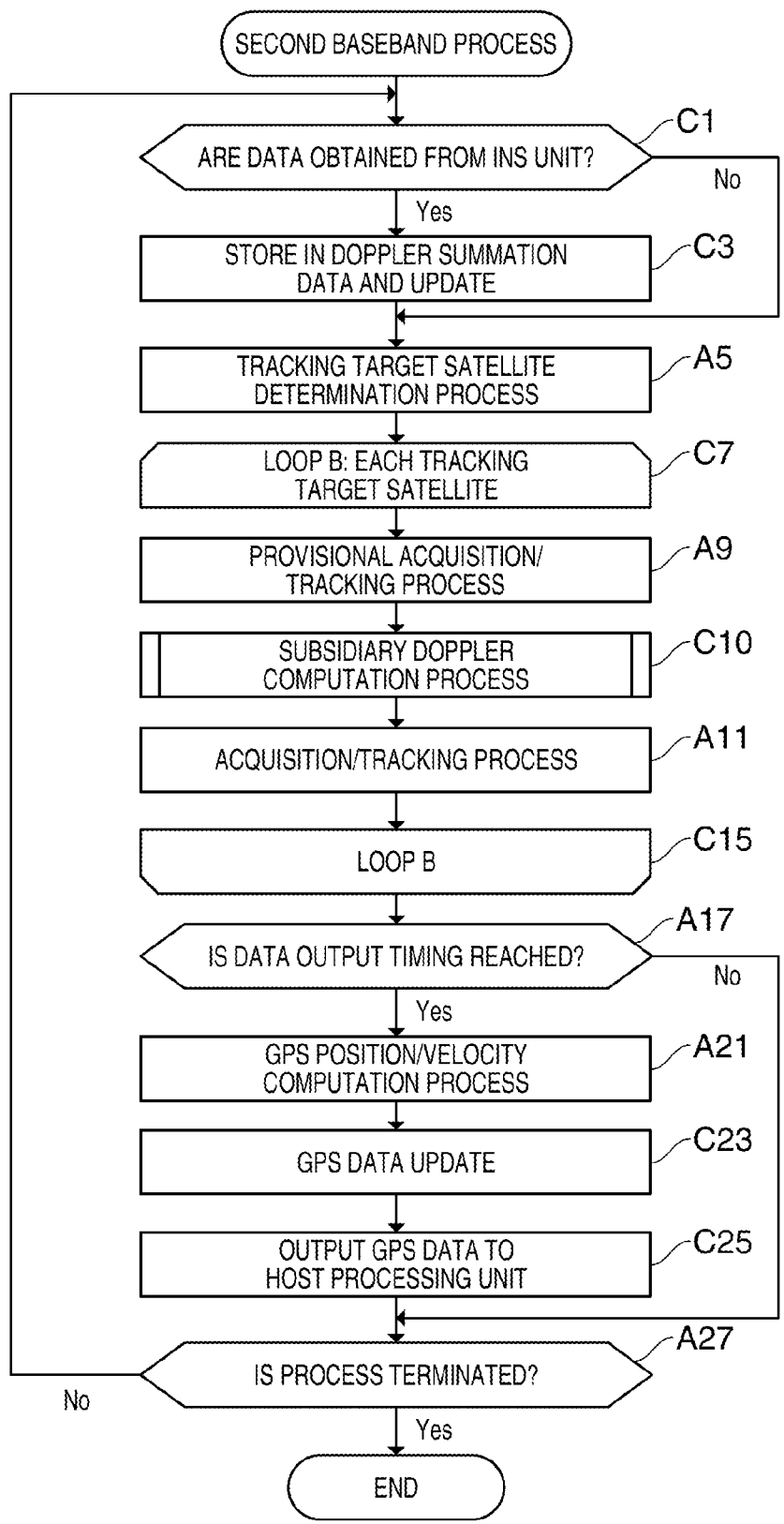
FIG. 14 is a flowchart illustrating a flow of a second baseband process.

FIG. 14 is a flowchart illustrating a flow of the second baseband process executed by the processing unit 150 of the baseband processing circuit unit 120 according to the second baseband processing program 162 stored in the storage unit 160.

If the data on the absolute coordinate acceleration vector 227 are obtained from the INS unit 200 in step C1 (YES in step C1), the processing unit 150 performs control such that the data on the absolute coordinate acceleration vector 227 are stored as the latest absolute coordinate acceleration vector 1713 in the Doppler summation data 171 (step C3).

The processing unit 150 carries out the provisional acquisition/tracking process (step A9) in the process of the loop B performed for each tracking target satellite (steps C7 to C15) and then carries out the subsidiary Doppler computation process (step C10) according to the subsidiary Doppler computation program 1621 stored in the storage unit 160.

Figure 15:
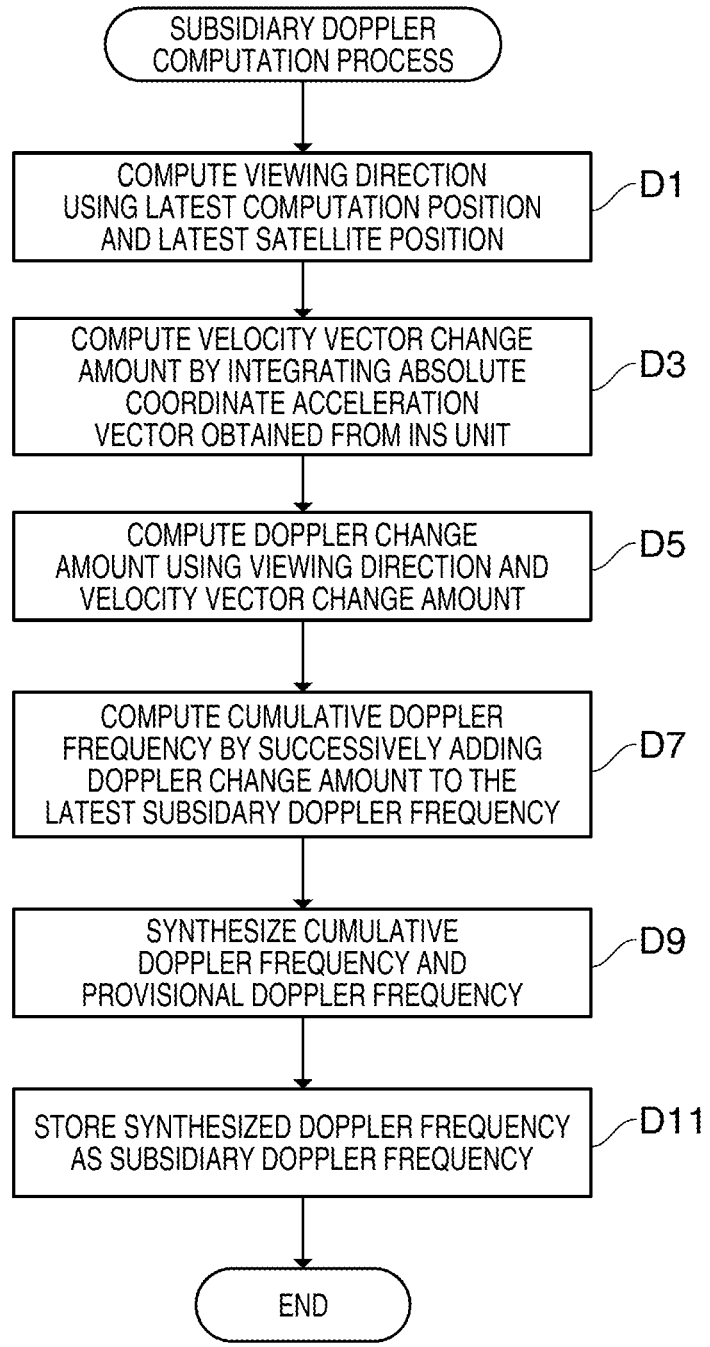
FIG. 15 is a flowchart illustrating a flow of a subsidiary Doppler computation process.

FIG. 15 is a flowchart illustrating a flow of the subsidiary Doppler computation process. First, the processing unit 150 computes the viewing direction for the tracking target satellite using the latest position included in the GPS data 168 and the latest satellite position of the tracking target satellite obtained from the satellite orbit data 163 (step D1). In addition, the processing unit 150 computes the change amount of the velocity vector for a predetermined time period by integrating the absolute coordinate acceleration vector 1713 for a predetermined time period stored in the Doppler summation data 171 (step D3).

Next, the processing unit 150 computes the Doppler change amount using the viewing direction computed in step D1 and the change amount of the velocity vector computed in step D3 (step D5). In addition, the processing unit 150 computes the cumulative Doppler frequency by successively adding the Doppler change amount computed in step D3 to the latest subsidiary Doppler frequency stored in the subsidiary Doppler data 166 (step D7).

Then, the processing unit 150 synthesizes the cumulative Doppler frequency computed in step D7 and the provisional Doppler frequency computed in the provisional acquisition/tracking process of step C9 (step D9). In addition, the processing unit 150 performs control such that the synthesized Doppler frequency is stored in the subsidiary Doppler data 166 as the latest subsidiary Doppler frequency (step D11). In addition, the processing unit 150 terminates the subsidiary Doppler computation process.

Returning to the second baseband process of FIG. 14, after the subsidiary Doppler computation process, the processing unit 150 carries out the acquisition/tracking process (step A11). In addition, the processing unit 150 advances the process to the next tracking target satellite, carries out the process for all tracking target satellites, and terminates the process of the loop B.

After the process of the loop B, if the GPS data output timing is reached (YES in step A17), the processing unit 150 carries out the GPS position/velocity computation process (step A21). Unlike the first baseband process of FIG. 9, the provisional GPS position/velocity computation process is not necessary in the second baseband process, and thus, skipped.

In addition, the processing unit 150 updates the GPS data 168 of the storage unit 160 using the computation result of the GPS position/velocity computation process (step C23). In addition, the processing unit 150 outputs the updated GPS data 168 to the host processing unit 400 (step C25).

Figure 16:
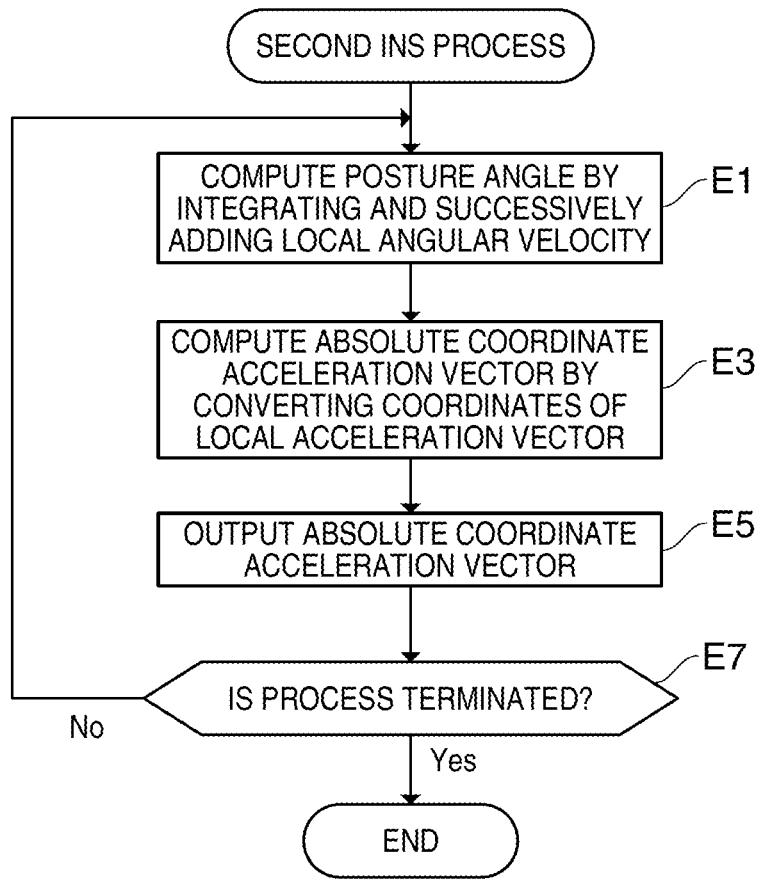
FIG. 16 is a flowchart illustrating a flow of a second INS process.

FIG. 16 is a flowchart illustrating a flow of the second INS process executed by the processing unit 210 of the INS unit 200 according to the second INS processing program 222 stored in the storage unit 220.

First, the processing unit 210 computes the posture angle by integrating and successively adding the local angular velocity detected by the gyrosensor 3B (step E1). In addition, the processing unit 210 converts the coordinates of the local acceleration vector detected by the acceleration sensor 3A and computes the absolute coordinate acceleration vector (step E3).

Next, the processing unit 210 outputs the absolute coordinate acceleration vector computed in step E3 to the GPS receiver unit 100 through the host processing unit 400 (step E5). In addition, the processing unit 210 determines whether or not the process is terminated (step E7). If it is determined that the process is not terminated (NO in step E7), the process returns to step E1. Otherwise, if it is determined that the process is terminated (YES in step E7), the second INS process is terminated.

3. Experimental Result

An experimental result obtained in practice from the position computation using the position computation system of the present embodiment will be described. Under three kinds of receiving environments including an intense electric field environment, a weak electric field environment, and a multipath environment, a vehicle having the position computation system is driven in advance along a predetermined path. In addition, the position computed using the technique of the related art and the position computed using the present embodiment are plotted on a map. In the following map as an experimental result, the true trajectory of the vehicle is represented by a dotted line, the trajectory of the vehicle computed using the technique of the related art is represented by a narrow solid line, and the trajectory computed using the technique of the present embodiment is represented by a thick solid line.

Figure 17:
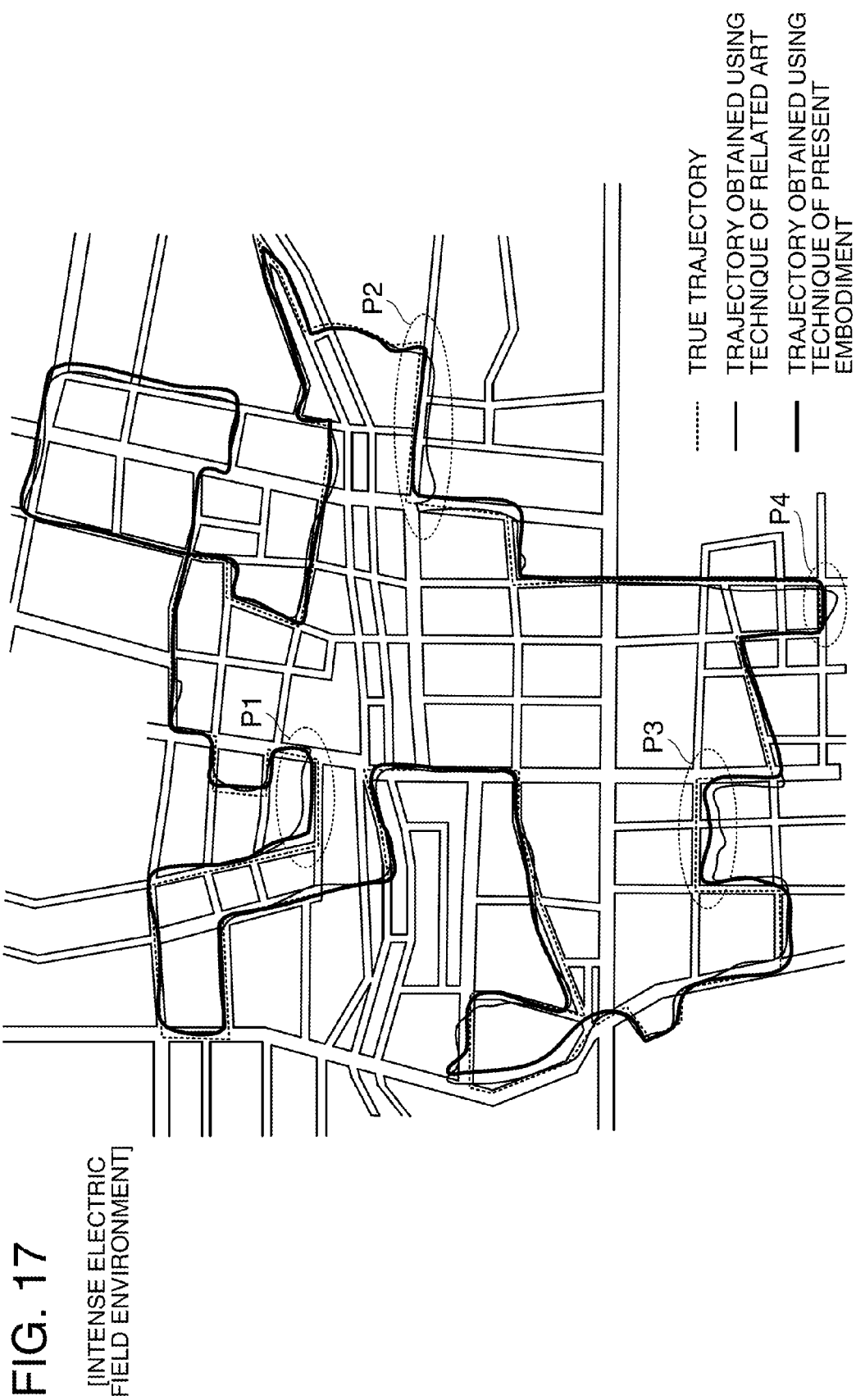
FIG. 17 is a diagram illustrating an exemplary experiment result in an intense electric field environment.

FIG. 17 is a diagram illustrating an exemplary experimental result under an intense electric field environment. Under the intense electric field environment, it is possible to obtain a relatively good trajectory even by the technique of the related art. However, for example, in the portions P1 to P4 surrounded by an oval, it is recognized that the trajectory computed using the technique of the related art fails to track the true trajectory. In contrast, focusing on the trajectory computed using the technique of the present embodiment, it is recognized that the trajectory computed using the technique of the present embodiment nearly tracks the true trajectory even in the portions P1 to P4 so that the accuracy of the position computation is improved.

Figure 18:
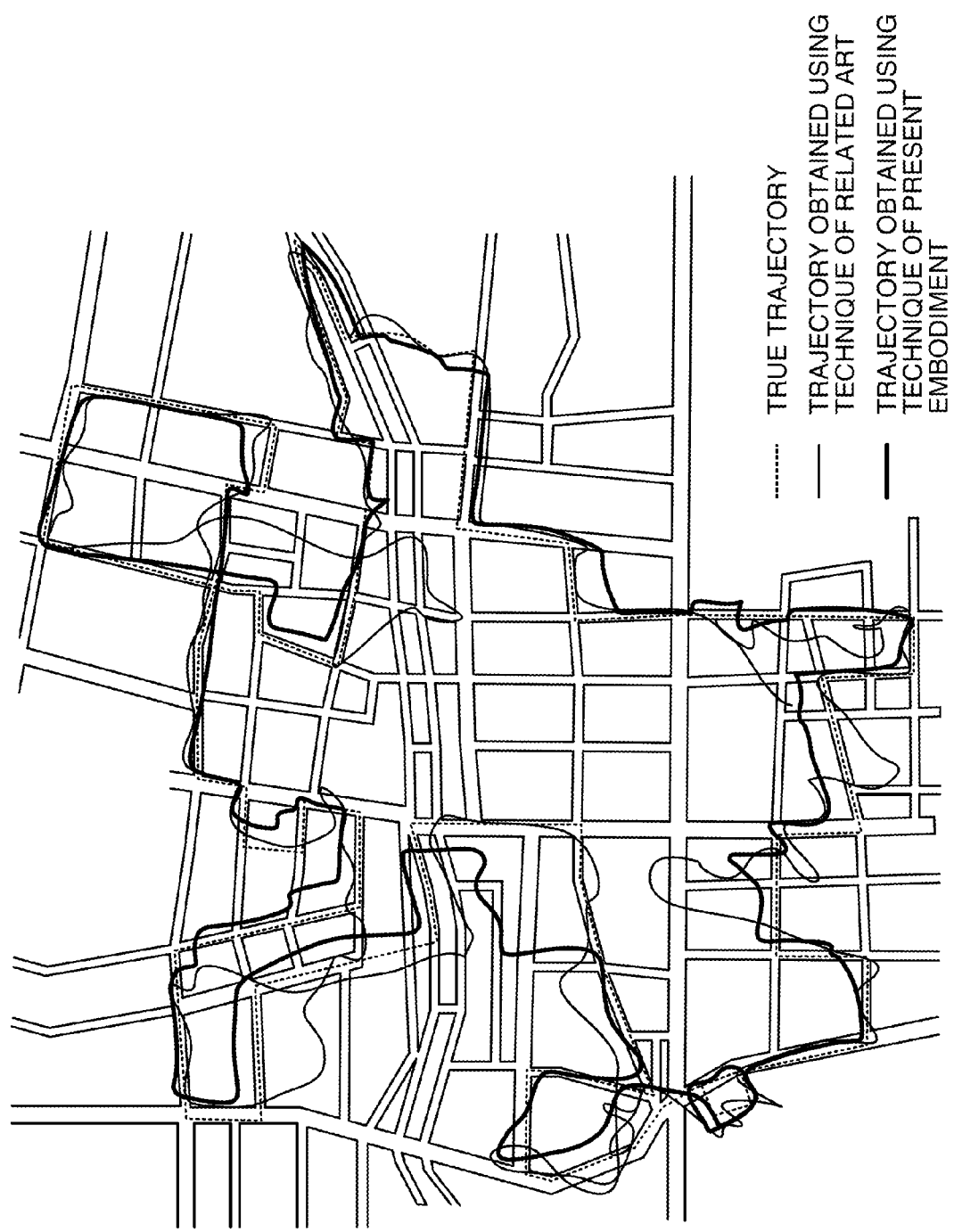
FIG. 18 is a diagram illustrating an exemplary experiment result in a weak electric field environment.

FIG. 18 is a diagram illustrating an exemplary experimental result under a weak electric field environment. Under the weak electric field environment, the accuracy of the position computation is remarkably degraded in comparison with the intense electric field environment. Particularly, focusing on the trajectory computed using the technique of the related art, it is recognized that significant position jumping or overshooting occurs in places, and it nearly fails to track the true trajectory. In contrast, focusing on the trajectory obtained using the technique of the present embodiment, it is recognized that the significant position jumping or overshooting is suppressed, and a relatively excellent result can be obtained. Here, the "position jumping" means a phenomenon in which the computation position is significantly deviated from the true position. In addition, the "overshooting" means a phenomenon in which the computation position fails to turn at the turning point and passes by the turning point.

Figure 19:
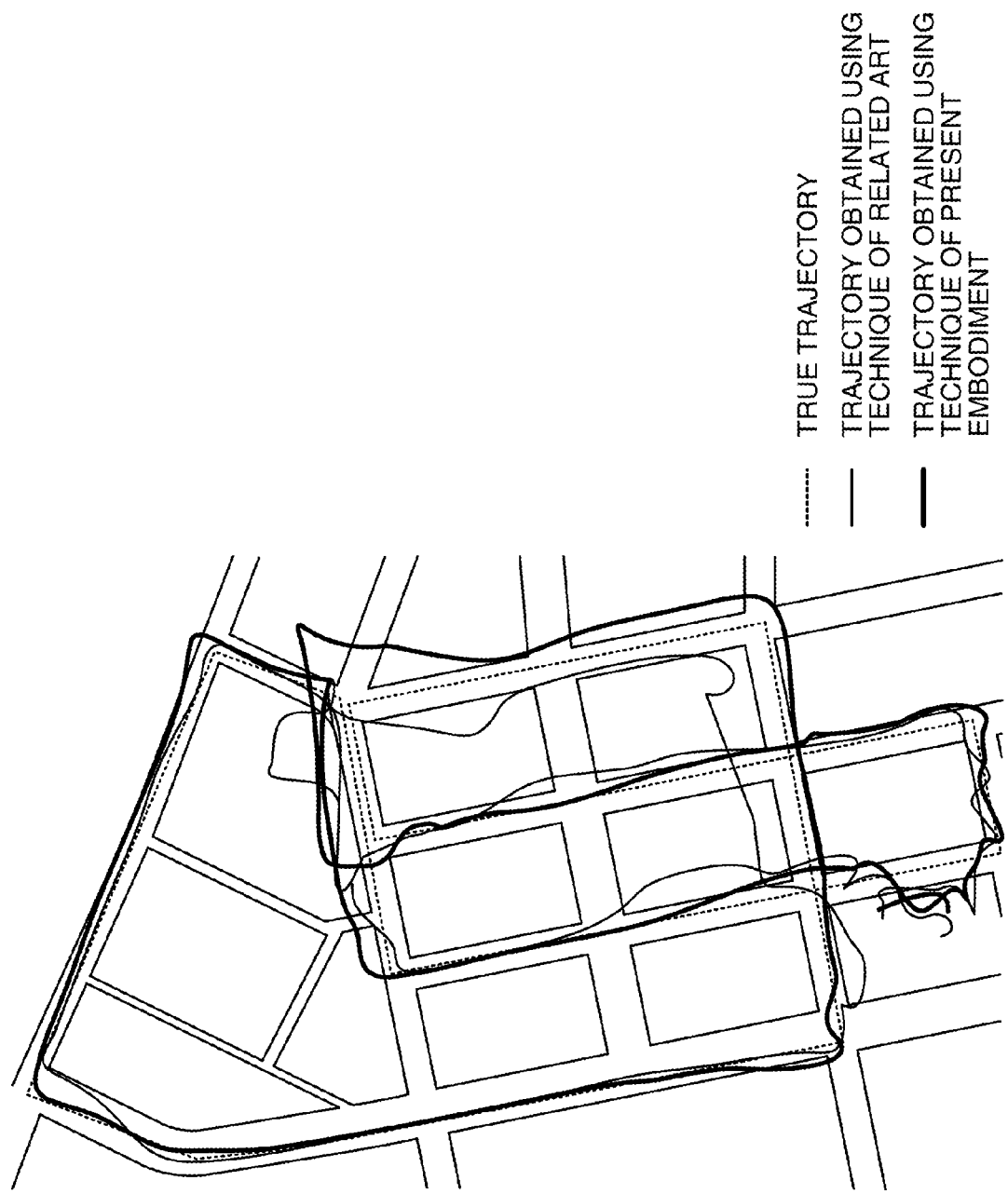
FIG. 19 is a diagram illustrating an exemplary experiment result in a multipath environment.

FIG. 19 is a diagram illustrating an exemplary experimental result under a multipath environment. The experiment was performed by selecting a place where the multipath can be easily generated unlike the experiment place of FIGS. 17 and 18. Focusing on the experimental result thereof, it is recognized that the true trajectory of the vehicle is straight along the road, but the trajectory computed using the technique of the related art is significantly meandering. In contrast, focusing on the trajectory computed using the technique of the present embodiment, it is recognized that the computed trajectory generally tracks the true trajectory although it is partially deviated from the true trajectory in several places. Through the experimental result described above, the effectiveness of the position computation technique of the present embodiment has been proven.

4. Effects

In the first position computation method, the provisional Doppler frequency (first Doppler frequency) is computed by carrying out a provisional loop-filtering process for the received signal obtained by receiving the GPS satellite signal from the GPS positioning satellite. In addition, the provisional position and the provisional velocity vector are computed using the provisional Doppler frequency. Meanwhile, inertial navigation operations are performed using a part of the signal from a sensor unit including at least an acceleration sensor to compute the position and the velocity vector. In addition, the computed position and the velocity vector are corrected using the provisional position and the provisional velocity vector, and the subsidiary Doppler frequency (second Doppler frequency) is computed using the correction result. In addition, a loop-filtering process is performed for the received signal obtained by receiving the GPS satellite signal, and a final Doppler frequency (fourth Doppler frequency) is computed using the result of the loop-filtering and the subsidiary Doppler frequency.

In the second position computation method, the cumulative Doppler frequency (third Doppler frequency) is computed using a part of the signal from the sensor unit including a gyrosensor and an acceleration sensor. In addition, the subsidiary Doppler frequency (second Doppler frequency) is computed by synthesizing the provisional Doppler frequency (first Doppler frequency) and the cumulative Doppler frequency (third Doppler frequency). In addition, the loop-filtering process is performed for the received signal obtained by receiving the GPS satellite signal, and the final Doppler frequency (fourth Doppler frequency) is computed using the result of the loop-filtering and the subsidiary Doppler frequency.

In either method, it is possible to improve accuracy of the position/velocity computation by more precisely computing the Doppler frequency and appropriately acquiring/tracking the GPS satellite signal. In the first position computation method, it is possible to appropriately obtain the subsidiary Doppler frequency by computing the position and the velocity vector with high accuracy by coupling the GPS and the INS and computing the subsidiary Doppler frequency using the computation result thereof. In contrast, in the second position computation method, it is possible to appropriately and conveniently obtain the subsidiary Doppler frequency by skipping the computation of the position and the velocity vector using the INS and synthesizing the provisional Doppler frequency and the cumulative Doppler frequency computed using the acceleration vector in an absolute coordinate system.

5. Modified Examples

Hereinafter, modified examples will be described. For the configuration common to the aforementioned examples, like reference numerals denote like elements, and description thereof will not be repeated.

5-1. Switching of Acquisition/Tracking Process Based on Signal Strength

The acquisition/tracking process in the course of execution may be switched based on the signal strength of the received signal received from each tracking target satellite.

Figure 20:
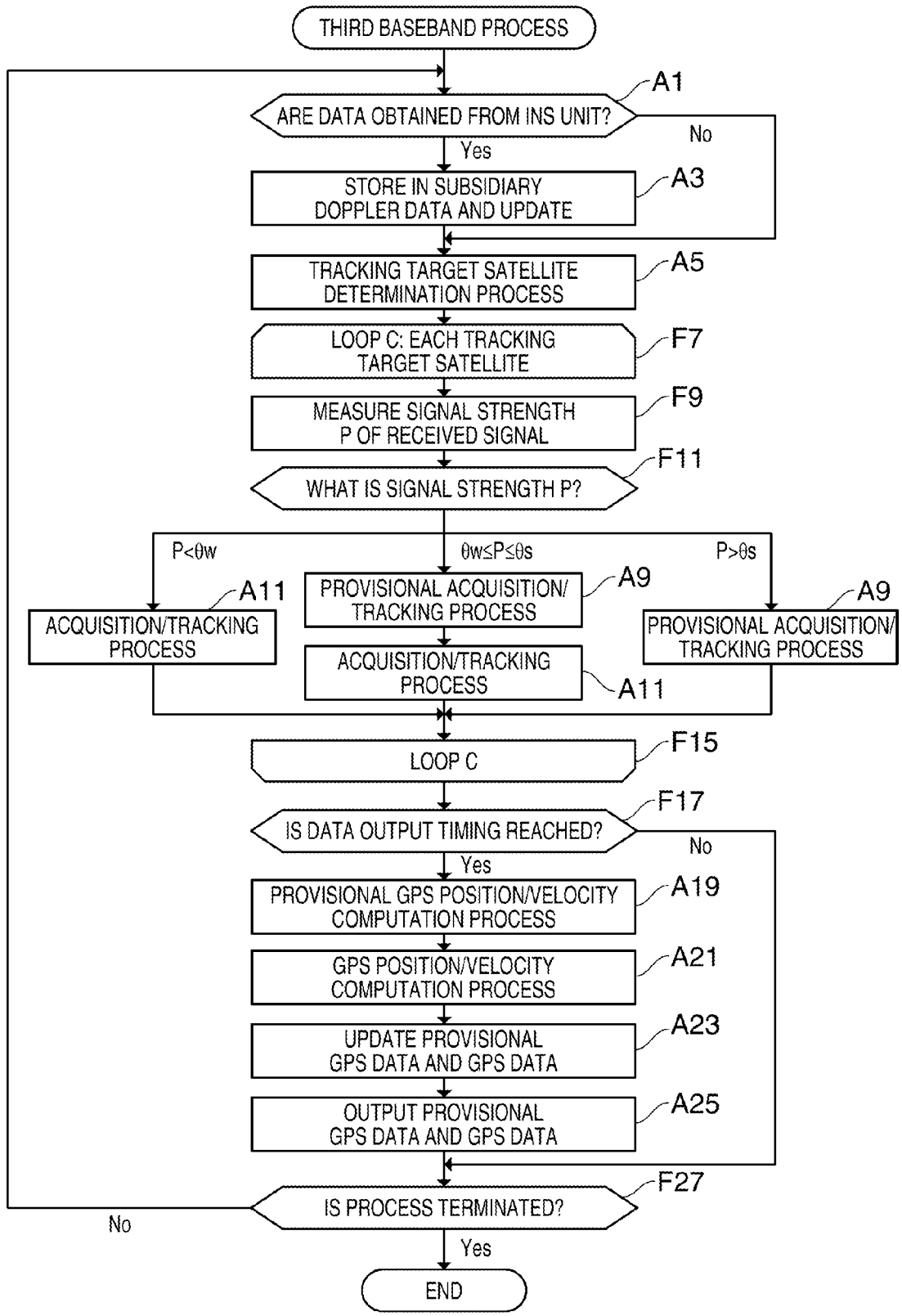
FIG. 20 is a flowchart illustrating a flow of a third baseband process.

FIG. 20 is a flowchart illustrating a flow of the third baseband process performed by the processing unit 150 instead of the first baseband process of FIG. 9.

The processing unit 150 measures the signal strength P of the signal received from the tracking target satellite in the process of the loop C (steps F7 to F15) performed for each tracking target satellite (step F9). The signal strength P of the received signal can be measured, for example, as a carrier to noise (C/N) ratio.

The processing unit 150 determines the measured signal strength P (step F11). If the signal strength P exceeds a predetermined high-strength threshold value $\theta_s$ (step F11: P>$\theta_s$), the processing unit 150 carries out the provisional acquisition/tracking process (step A9). In addition, the processing unit 150 advances the process to the next tracking target satellite.

Meanwhile, if the signal strength P is lower than a predetermined low-strength threshold value $\theta_w$ (step F11: P<$\theta_w$), the processing unit 150 carries out the acquisition/tracking process (step A11). In addition, the processing unit 150 advances the process to the next tracking target satellite.

In addition, if the signal strength P is equal to or higher than the low-strength threshold value $\theta_w$, and equal to or lower than the high-strength threshold value $\theta_s$ (step F11; $\theta_w \leq P \leq \theta_s$), the processing unit 150 carries out the provisional acquisition/tracking process and the acquisition/tracking process (steps A9 and A11). In addition, the processing unit 150 advances the process to the next tracking target satellite.

In this process, the provisional acquisition/tracking process is skipped for the satellite having a weak signal strength, and the acquisition/tracking process is skipped for the satellite having a strong signal strength. For the satellite having a weak signal strength, the Doppler frequency may not be appropriately obtained even when the provisional loop-filtering process is performed with a wide loop bandwidth (for example, 4 Hz). In this regard, the processing load can be reduced by skipping the provisional acquisition/tracking process. In contrast, for the satellite having a strong signal strength, a sufficiently precise Doppler frequency may be obtained only by carrying out the provisional loop-filtering process even when the loop-filtering process with a narrow loop bandwidth (for example, 1 Hz) is not performed. In this regard, the processing load can be reduced by skipping the acquisition/tracking process.

Although the subsequent process is the same as that of the first baseband process, in the provisional GPS position/velocity computation process (step A19), the provisional position and the provisional velocity vector are computed using the provisional measurement information of the tracking target satellite which carries out the provisional acquisition/tracking process in the process of the loop C. In addition, in the GPS position/velocity computation process (step A21), the position and the velocity vector are computed using the measurement information of the tracking target satellite that carries out the acquisition/tracking process in the process of the loop C.

Figure 21:
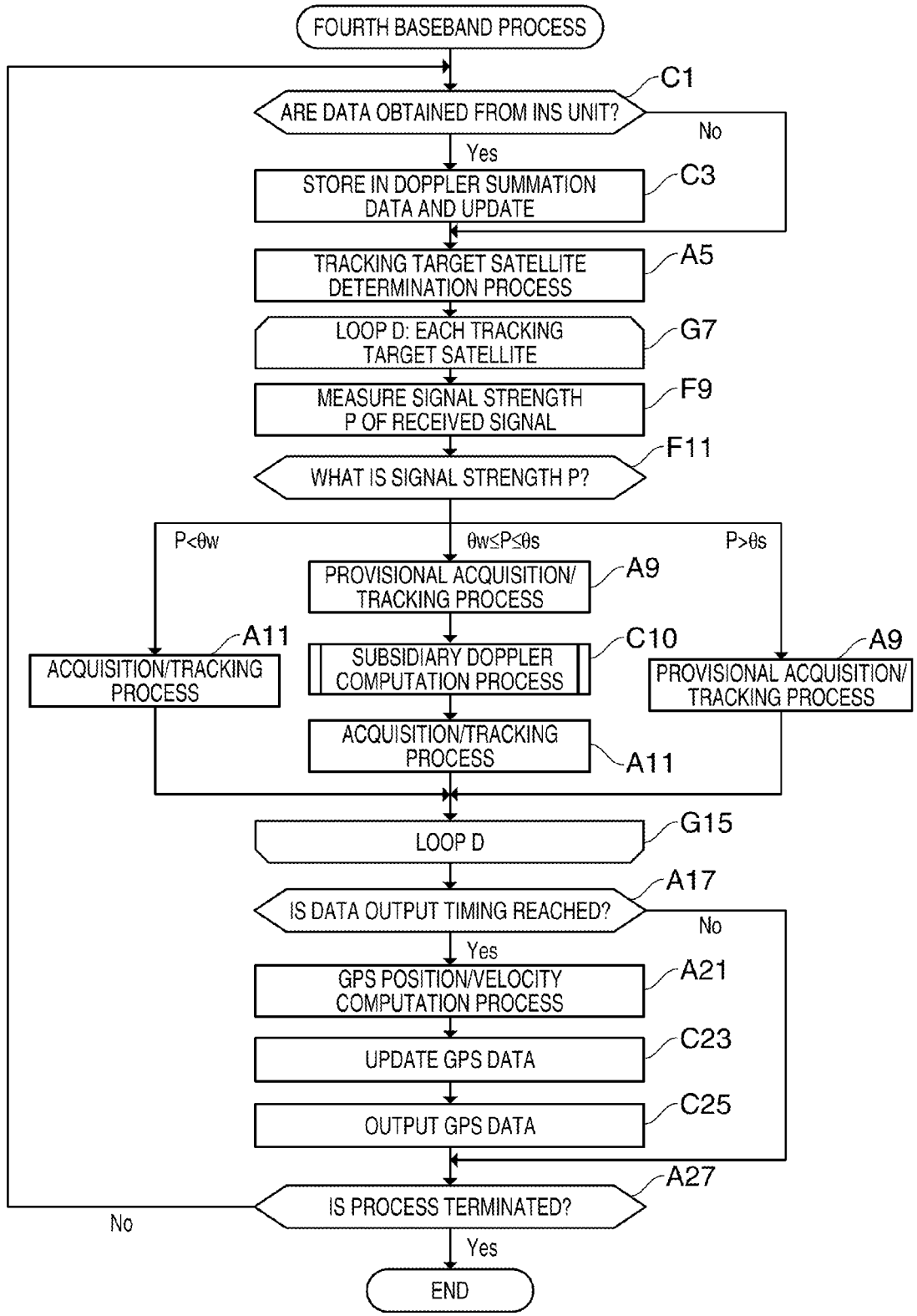
FIG. 21 is a flowchart illustrating a flow of a fourth baseband process.

The aforementioned process may be similarly applicable to the second baseband process. FIG. 21 is a flowchart illustrating a flow of the fourth baseband process performed by the processing unit 150 instead of the second baseband process of FIG. 14.

In the process of the loop D (steps G7 to G15) performed for each tracking target satellite, if the signal strength P exceeds a predetermined high-strength threshold value $\theta_s$ (step F11: P>$\theta_s$), the processing unit 150 carries out the provisional acquisition/tracking process (step A9). In addition, the processing unit 150 advances the process to the next tracking target satellite.

In addition, if the signal strength P of the received signal is lower than a predetermined low-strength threshold value $\theta_w$ (step F11: P<$\theta_w$), the processing unit 150 carries out the acquisition/tracking process (step A11). In addition, the processing unit 150 advances the process to the next tracking target satellite.

If the signal strength P is equal to or higher than the low-strength threshold value $\theta_w$, and equal to or lower than the high-strength threshold value $\theta_s$ (step F11; $\theta_w \leq P \leq \theta_s$), the processing unit 150 carries out the provisional acquisition/tracking process (step A9), the subsidiary Doppler computation process (step C10), and the acquisition/tracking process (step A11). In addition, the processing unit 150 advances the process to the next tracking target satellite.

5-2. Correction of Cumulative Doppler Frequency

The cumulative Doppler frequency used to compute the subsidiary Doppler frequency may be corrected using the movement direction computed by the INS. As the posture angle of the mobile object is obtained using the detection result of the gyrosensor, the movement direction of the mobile object is obtained. In this case, the INS unit outputs the movement direction of the mobile object obtained from the posture angle to the GPS receiver unit. In addition, the GPS receiver unit corrects the cumulative Doppler frequency using the movement direction obtained from the INS unit.

Figure 22:
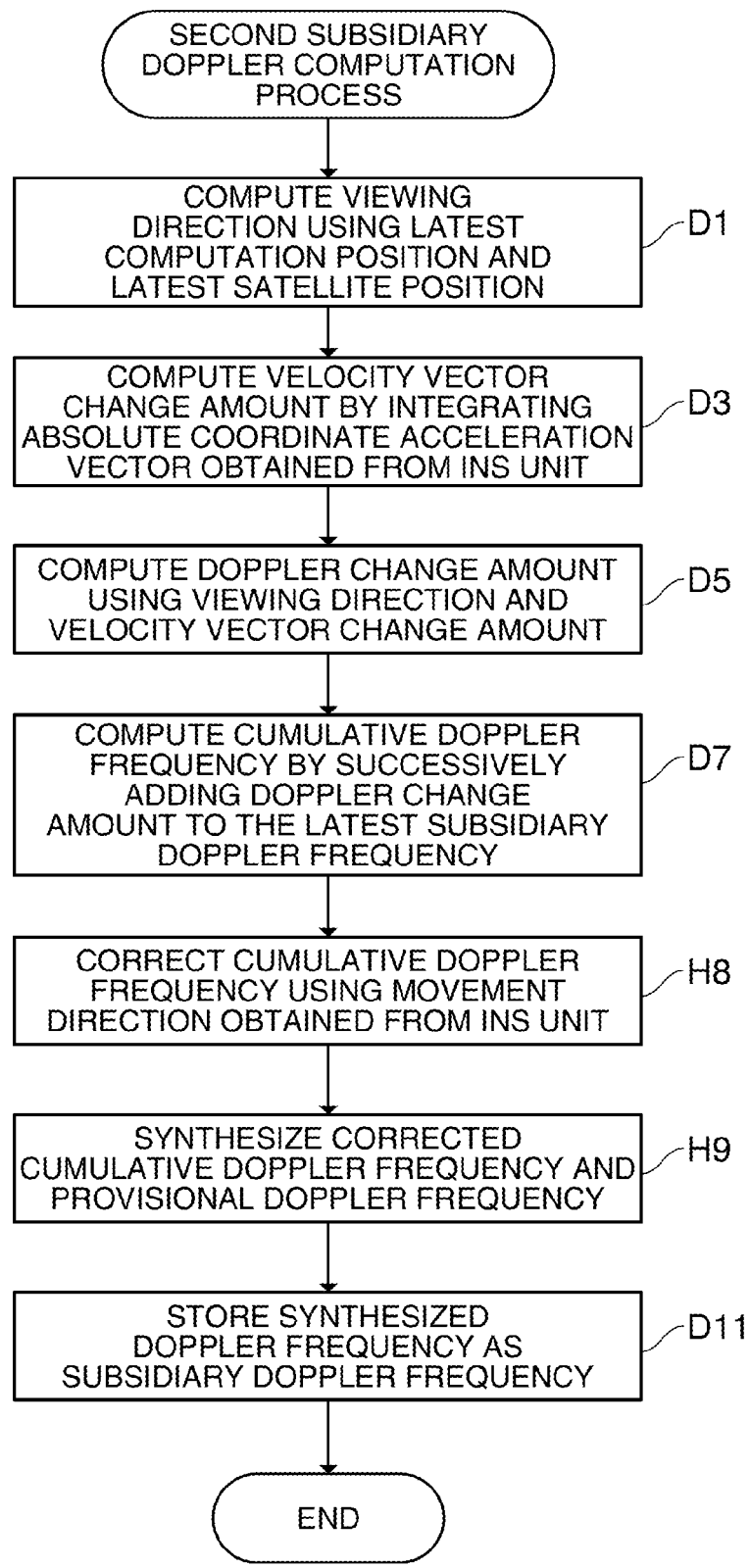
FIG. 22 is a flowchart illustrating a flow of a second subsidiary Doppler computation process.

FIG. 22 is a flowchart illustrating a flow of the second subsidiary Doppler computation process performed by the processing unit 150 instead of the subsidiary Doppler computation process of FIG. 15 in this case. For the steps same as those of the subsidiary Doppler computation process, like reference numerals denote like elements, and description thereof will not be repeated.

The processing unit 150 corrects the cumulative Doppler frequency using the movement direction obtained from the INS unit after computing the cumulative Doppler frequency in step D7 (step H8). Specifically, the Doppler frequency component in the corresponding direction is computed by projecting the cumulative Doppler frequency to the velocity vector change amount computed in step D3. In addition, the cumulative Doppler frequency is reconstructed by correcting the direction from the INS unit to the obtained movement direction and projecting the corresponding Doppler frequency to the viewing direction again while the magnitude of the corresponding Doppler frequency component is maintained.

Next, the processing unit 150 synthesizes the provisional Doppler frequency and the cumulative Doppler frequency corrected in step H8 (step H9). In addition, the processing unit 150 performs control such that the synthesized Doppler frequency is stored as the subsidiary Doppler frequency (step D11), and terminates the second subsidiary Doppler computation process.

5-3. Processing Subject

In the aforementioned example, the processing unit of the baseband processing circuit unit carries out the acquisition/tracking process of the GPS satellite signal and the position/velocity computation process. However, such a processing subject may be appropriately changed.

For example, the processing subject may be changed as follows. The processing unit of the baseband processing circuit unit carries out the provisional acquisition/tracking process and the acquisition/tracking process to obtain the provisional measurement information and the measurement information and outputs them to the host processing unit as a processor of the electronic apparatus. In addition, the host processing unit carries out the provisional GPS position/velocity computation process and the GPS position/velocity computation process using the measurement information and the provisional measurement information obtained from the baseband processing circuit unit to compute the provisional GPS data (provisional position and the provisional velocity vector) and the GPS data (position and velocity vector).

5-4. Acquisition/Tracking of Satellite Signal

Although the acquisition/tracking of the GPS satellite signal is performed using software through digital signal processing in the aforementioned embodiment, the acquisition/tracking may be performed by an acquisition/tracking circuit using hardware. In this case, the receiver may include two kinds of loop circuits including a provisional loop-filtering circuit for carrying out the provisional acquisition/tracking and a loop-filtering circuit for carrying out the acquisition/tracking as a loop circuit for a feedback of the output from the correlation computation unit.

The provisional loop-filtering circuit and the loop-filtering circuit are provided with a provisional loop-filtering unit and a loop-filtering unit, respectively. In addition, a provisional loop bandwidth (first loop bandwidth) is set as a bandwidth of the provisional loop-filtering unit, and a loop bandwidth (second loop bandwidth) narrower than the provisional loop bandwidth is set as a bandwidth of the loop-filtering unit.

In the baseband processing circuit unit of the aforementioned examples, removal of the carrier from the received carrier signal or correlation between the received CA code and the replica CA code is implemented by the carrier removal circuit unit or the correlation circuit unit using hardware. However, such processes may be implemented through digital signal processing using software.

5-5. GPS Receiver Unit

In the first position computation system 1, the GPS receiver unit is provided with two channels including first and second channels. However, a pair of GPS receiver units including a first GPS receiver unit having a first channel and a second GPS receiver unit having a second channel may be provided. In this case, a pair of GPS receivers corresponding to the first and second GPS receiver units may be mounted in the electronic apparatus.

5-6. INS Unit

In the aforementioned embodiments, the INS unit is separate from the sensor unit. However, the INS unit and the sensor unit may be integrated into a single body. In this case, the processing unit, the storage unit, and the IMU unit may be included in the INS unit, and the inertial navigation apparatus corresponding to the INS unit may be mounted in the electronic apparatus.

5-7. Electronic Apparatus

In the aforementioned example, the invention is applied to a car navigation apparatus mounted in a four-wheel vehicle. However, electronic apparatuses to which the invention may be applicable are not limited thereto. For example, the invention may be applicable to a navigation apparatus mounted in a two-wheel vehicle or a portable navigation apparatus.

It is clear that the invention may be similarly applicable to electronic apparatuses in fields other than navigation. For example, the invention may be similarly applicable to other electronic apparatuses such as a mobile phone, a PC, and a personal digital assistant (PDA).

5-8. Satellite Positioning System

In the aforementioned embodiments, the GPS has been exemplified as a satellite positioning system. However, the invention may be applicable to other satellite positioning systems such as a wide area augmentation system (WAAS), a quasi zenith satellite system (QZSS), a global navigation satellite system (GLONASS), and GALILEO.

The entire disclosure of Japanese Patent Application No. 2010-181701, filed on Aug. 16, 2010 is expressly incorporated by reference herein.

What is claimed is:

1. A satellite signal tracking method performed by a receiver that receives a satellite signal from each of a plurality of positioning satellites, the satellite signal tracking method comprising:
    for each of the positioning satellites:
        computing a first Doppler frequency using a received signal obtained by receiving the satellite signal;
    computing an inertial position using acceleration measurement data from a sensor unit for measuring the acceleration of the receiver, the sensor unit including at least an acceleration sensor;
    computing a provisional position using the first Doppler frequency and the received satellite signal of each of the plurality of positioning satellites;
    correcting the inertial position using the provisional position to derive a corrected position of the receiver;
    for each of the positioning satellites:
        computing a second Doppler frequency using at least:
            the acceleration measurement data; and
            a computed viewing direction from the corrected position of the receiver to the positioning satellite obtained from satellite orbit information of the positioning satellite and the corrected position of receiver; and
        tracking the satellite signal using the second Doppler frequency.

2. The satellite signal tracking method according to claim 1, wherein the computation of the second Doppler frequency includes:
    computing a third Doppler frequency using the acceleration measurement from the sensor unit and the computed viewing direction from the receiver to the positioning satellite; and
    computing a weighted-average of the first Doppler frequency and the third Doppler frequency to derive the second Doppler frequency.

3. The satellite signal tracking method according to claim 2, wherein the computation of the third Doppler frequency includes:
    computing a Doppler frequency change amount using the computed viewing direction and the acceleration measurement from the sensor unit; and
    computing the third Doppler frequency by summing the Doppler frequency change amount with a latest second Doppler frequency.

4. The satellite signal tracking method according to claim 2, wherein computing the weighted-average includes:
    scaling the third Doppler frequency by a first weight factor; and
    scaling the first Doppler frequency by a second weight factor,
    wherein the first weight factor is larger than the second weight factor.

5. The satellite signal tracking method according to claim 1, further comprising:
    filtering via a first loop filter that filters the received signal of the satellite signal at a first loop bandwidth to derive a first filtered received signal;
    filtering via a second loop filter that filters the received signal of the satellite signal at a second loop bandwidth narrower than the first loop bandwidth to derive a second filtered received signal;
    computing a fourth Doppler frequency using the second filtered received signal and the second Doppler frequency; and
    tracking the satellite signal using the fourth Doppler frequency,
    wherein the computation of the first Doppler frequency includes computing the first Doppler frequency by filtering via the first loop filter.

6. The satellite signal tracking method according to claim 1, further comprising:
    outputting a first position corresponding to tracking the satellite signal using the first Doppler frequency when a signal strength of the satellite signal is above a signal strength threshold, and
    outputting a second position corresponding to tracking the satellite signal using the second Doppler frequency when the signal strength of the satellite signal is not above the signal strength threshold.

7. A receiver that receives a satellite signal from each of a plurality of positioning satellites, the receiver comprising:
    a first Doppler computation unit that, for each of the positioning satellites, computes a first Doppler frequency using a received signal obtained by receiving the satellite signal;
    a provisional position computation unit that computes a provisional position using the first Doppler frequency and the received satellite signal of each of the plurality of positioning satellites;
    an inertial position computation unit that computes an inertial position using acceleration measurement data from a sensor unit for measuring the acceleration of the receiver, the sensor unit including at least an acceleration sensor;
    an inertial position correction unit that corrects the inertial position using the provisional position to derive a corrected position of the receiver;
    a second Doppler computation unit that, for each of the positioning satellites, computes a second Doppler frequency using at least:
        the acceleration measurement data; and
        a computed viewing direction from the corrected position of the receiver to the positioning satellite obtained from satellite orbit information of the positioning satellite and the corrected position of receiver; and a tracking unit that, for each of the positioning satellites, tracks the satellite signal using the second Doppler frequency.

\* \* \* \* \*